US012587332B2

(12) United States Patent
Aio et al.

(10) Patent No.: US 12,587,332 B2
(45) Date of Patent: Mar. 24, 2026

(54) COMMUNICATION DEVICE AND COMMUNICATION METHOD

(71) Applicant: SONY GROUP CORPORATION, Tokyo (JP)

(72) Inventors: Kosuke Aio, Tokyo (JP); Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 312 days.

(21) Appl. No.: 18/261,865

(22) PCT Filed: Dec. 24, 2021

(86) PCT No.: PCT/JP2021/048267
§ 371 (c)(1),
(2) Date: Jul. 18, 2023

(87) PCT Pub. No.: WO2022/163266
PCT Pub. Date: Aug. 4, 2022

(65) Prior Publication Data
US 2024/0163039 A1     May 16, 2024

(30) Foreign Application Priority Data

Jan. 27, 2021     (JP) ................................. 2021-011415

(51) Int. Cl.
*H04W 84/12*     (2009.01)
*H04L 5/00*      (2006.01)
*H04W 72/27*     (2023.01)

(52) U.S. Cl.
CPC .......... *H04L 5/0048* (2013.01); *H04L 5/0035* (2013.01); *H04W 72/27* (2023.01); *H04W 84/12* (2013.01)

(58) Field of Classification Search
CPC ................................ H04L 12/28; H04L 12/50
(Continued)

(56) References Cited

U.S. PATENT DOCUMENTS 9,152,555 B2 * 10/2015 Higgins .............. G06F 12/0238

FOREIGN PATENT DOCUMENTS

JP     2011-259241 A     12/2011
JP     2012-525740 A     10/2012
(Continued)

OTHER PUBLICATIONS

International Search Report and Written Opinion of PCT Application No. PCT/JP2021/048267, issued on Mar. 22, 2022, 09 pages of ISRWO.
(Continued)

*Primary Examiner* — Dang T Ton
(74) *Attorney, Agent, or Firm* — CHIP LAW GROUP

(57)     ABSTRACT

The present technology relates to a communication device and a communication method that allow an improvement in system throughput.
Provided is a communication device including a control unit configured to perform control to exchange, with a first another communication device by means of wireless communication, first information that is used when a plurality of communication devices executes coordinated transmission to share, with the first another communication device, threshold information regarding a sounding time on the basis of the first information. The present technology can be applied to communication devices that constitute a wireless LAN system, for example.

14 Claims, 19 Drawing Sheets

(58) Field of Classification Search
USPC ................................. 370/329, 401, 402, 403
See application file for complete search history.

(56) References Cited

FOREIGN PATENT DOCUMENTS

| | | |
|----|----------------|---------|
| JP | 2017-152988 A | 8/2017 |
| JP | 2020-182126 A | 11/2020 |

OTHER PUBLICATIONS

Solajia, et al., "Multi-AP Coordination:Recap and Additional 1-15 Considerations", IEEE 802.11-20/1713r2, Oct. 28, 2020, 19 pages.

* cited by examiner

Figure 17:
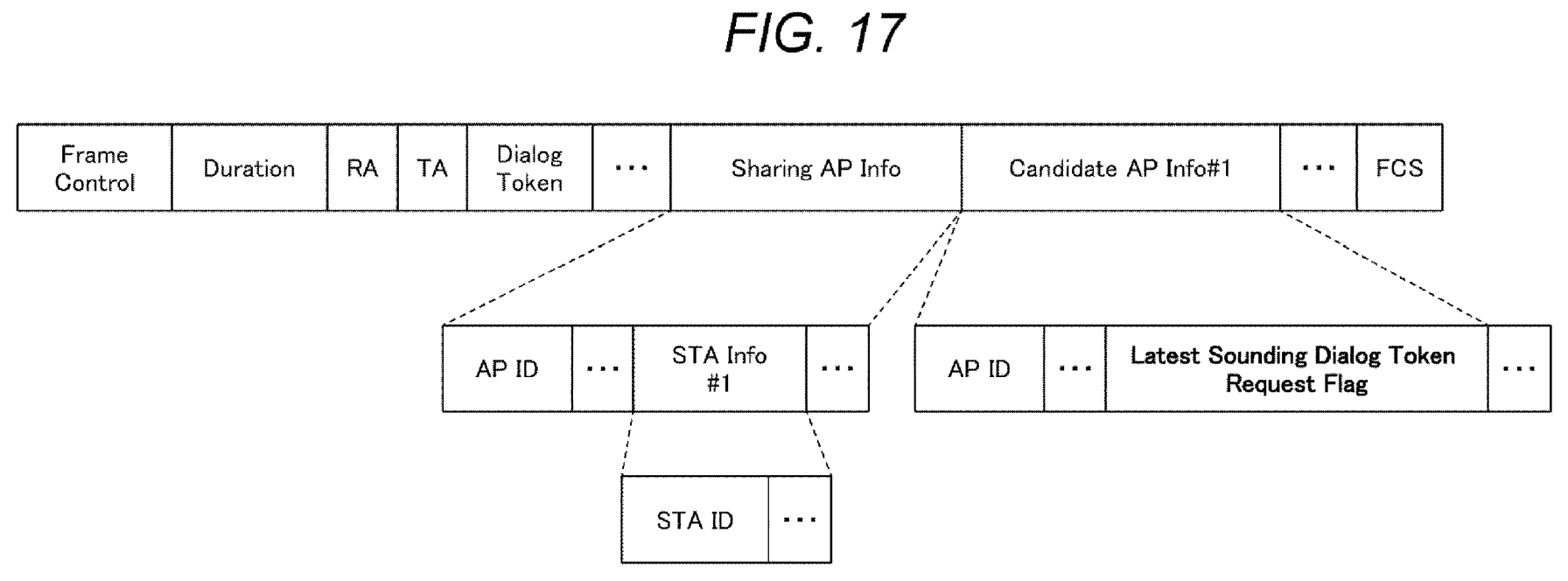

| Frame Control | Duration | RA | TA | Dialog Token | ... | Sharing AP Info | Candidate AP Info#1 | ... | FCS |
|---|---|---|---|---|---|---|---|---|---|

Candidate AP Info#1:

| AP ID | ... | Latest Sounding Dialog Token Request Flag |
|---|---|---|

Sharing AP Info:

| AP ID | ... | STA Info #1 | ... |
|---|---|---|---|

STA Info #1:

| STA ID | ... |
|---|---|

COMMUNICATION DEVICE AND COMMUNICATION METHOD

CROSS REFERENCE TO RELATED APPLICATIONS

This application is a U.S. National Phase of International Patent Application No. PCT/JP2021/048267 filed on Dec. 24, 2021 which claims priority benefit of Japanese Patent Application No. JP 2021-011415 filed in the Japan Patent Office on Jan. 27, 2021. Each of the above-referenced applications is hereby incorporated herein by reference in its entirety.

TECHNICAL FIELD

The present technology relates to a communication device and a communication method, and more particularly to a communication device and a communication method that allow an improvement in system throughput.

BACKGROUND ART

An environment such as a stadium or a house in which a plurality of access points (APs) of a wireless local area network (LAN) is placed is on the increase, and a technology for coordinating access points to improve a system throughput and improve reliability has recently attracted attention.

For example, joint transmission (hereinafter, referred to as JTX), which is one of the coordination schemes, causes a plurality of access points to execute coordinated transmission to one wireless terminal (station (STA)) using a multiple input and multiple output (MIMO) technology, and allows high-dimensional beamforming without increasing the number of antennas attached to an access point.

Furthermore, in coordinated beamforming (hereinafter, referred to as C-BF) disclosed as another coordination scheme, each terminal forms a beam so as to reduce an interference signal to a terminal that receives interference, thereby allowing a plurality of terminals to simultaneously transmit while preventing excessive deterioration in communication quality.

Each of the coordination schemes, however, requires sounding processing, which is processing of estimating a channel between an access point and a wireless terminal. At present, a technique of sounding among a plurality of access points has not been determined yet, but there is a technique disclosed in Non-Patent Document 1 as one scheme. Non-Patent Document 1 discloses a scheme in which each access point that operates in a coordinated manner transmits a measurement packet (null data packet (NDP)) to a wireless terminal group including a wireless terminal belonging to another cell to acquire transmission weight information (BF Report) based on channel estimation from the wireless terminal.

There are two cases: a case where a plurality of access points simultaneously transmits the NDP; and a case where a single access point transmits the NDP. Furthermore, Patent Document 1 discloses a technique for determining a coordination scheme on the basis of whether or not the BF Report is acquired as an inter-base station cooperative MIMO transmission method.

CITATION LIST

Patent Document

Patent Document 1: Japanese Patent Application Laid-Open No. 2011-259241

Non-Patent Document

Non-Patent Document 1: Kosuke Aico, et. al., "Consideration on Multi-AP Sounding," doc. IEEE 802.11-19/1134r1

SUMMARY OF THE INVENTION

Problems to be Solved by the Invention

Meanwhile, in a case where each access point acquires and holds the BF Report from a wireless terminal, there is a possibility that a difference occurs in sounding execution time of the BF Report managed by each access point due to the occurrence of an error during sounding.

Furthermore, Patent Document 1 described above discloses a technique for determining a coordination scheme on the basis of whether or not the BF Report is acquired, but there is also a case where coordinated transmission is executed on the basis of BF Report information acquired in the past in an environment where there is little channel variation.

Accordingly, there has been a demand for a technique for improving a system throughput while re-executing sounding, executing coordinated transmission, or the like.

The present technology has been made in view of such circumstances, and it is therefore an object of the present technology to improve a system throughput.

Solutions to Problems

A communication device according to one aspect of the present technology includes a control unit configured to perform control to exchange, with a first another communication device by means of wireless communication, first information that is used when a plurality of communication devices executes coordinated transmission to share, with the first another communication device, threshold information regarding a sounding time on the basis of the first information.

A communication method according to one aspect of the present technology includes causing a communication device to exchange, with a first another communication device by means of wireless communication, first information that is used when a plurality of communication devices executes coordinated transmission to share, with the first another communication device, threshold information regarding a sounding time on the basis of the first information.

In the communication device according to one aspect of the present technology and the communication method according to one aspect of the present technology, the exchange, with the first another communication device, of the first information that is used when a plurality of communication devices executes coordinated transmission is made by means of wireless communication to share, with the first another communication device, threshold information regarding a sounding time on the basis of the first information.

Note that the communication device according to one aspect of the present technology may be an independent device or an internal block constituting one device.

BRIEF DESCRIPTION OF DRAWINGS

FIG. 6 is a diagram illustrating a configuration example of a Coordination Set frame.

FIG. 11 is a diagram illustrating a configuration example of a Coordination Request frame.

FIG. 16 is a flowchart illustrating a processing flow of the master AP in the Sounding Phase.

FIG. 17 is a diagram illustrating a configuration example of the Coordination Request frame.

MODE FOR CARRYING OUT THE INVENTION

System Configuration Example

Figure 1:
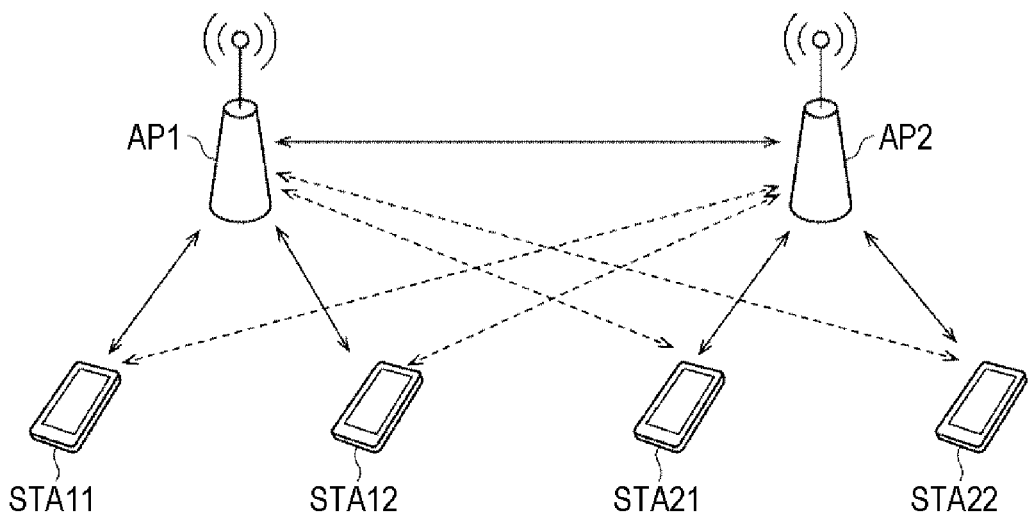
FIG. 1 is a diagram illustrating a configuration example of a wireless LAN system to which the present technology is applied.

FIG. 1 is a diagram illustrating a configuration example of a wireless LAN system to which the present technology is applied.

In FIG. 1, the wireless LAN system includes two access points AP1 and AP2 and four wireless terminals STA11, STA12, STA21, and STA22. The wireless terminals STA11 and STA12 are connected to the access point AP1, and the wireless terminals STA21 and STA22 are connected to the access point AP2.

Furthermore, it is assumed that a communication device that uses a channel in the same band as a band used by the access points AP and the wireless terminals STA described above is present nearby.

Note that a target system configuration is not limited to the configuration illustrated in FIG. 1, it is only required that a plurality of communication devices each having established connection be present, and a communication device be present as a peripheral terminal for each communication device, and no specific positional relationship is required as long as the above-described conditions are satisfied.

Configuration Example of Device

Figure 2:
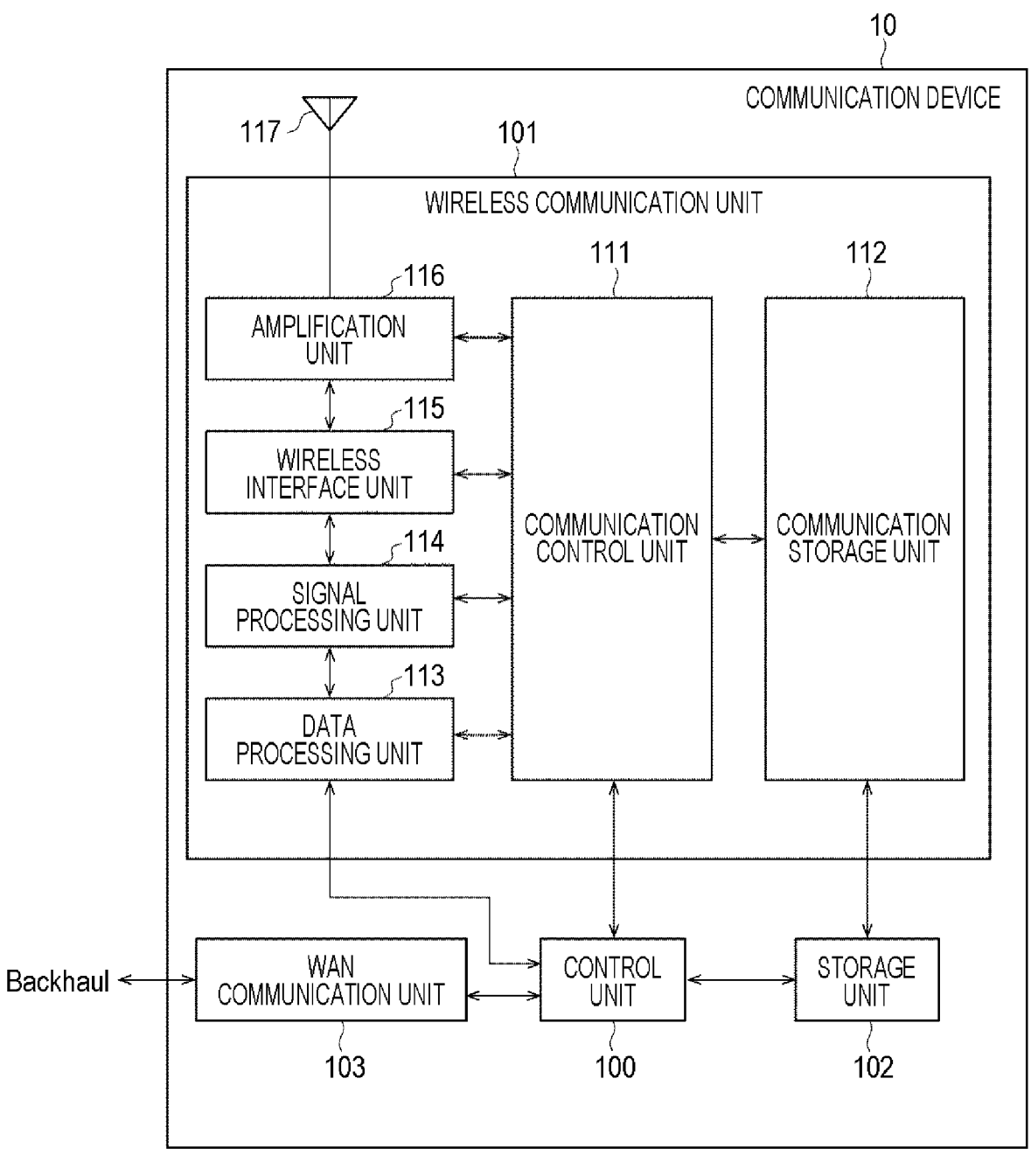
FIG. 2 is a block diagram illustrating a configuration example of a communication device to which the present technology is applied.

FIG. 2 is a diagram illustrating a configuration example of a communication device to which the present technology is applied.

A communication device 10 is configured as the access point AP in FIG. 1. The communication device 10 includes a control unit 100, a wireless communication unit 101, a storage unit 102, and a WAN communication unit 103. An antenna 117 is connected to the wireless communication unit 101.

The wireless communication unit 101 includes a communication control unit 111, a communication storage unit 112, a data processing unit 113, a signal processing unit 114, a wireless interface unit 115, and an amplification unit 116.

The communication control unit 111 controls operation of each unit and information transmission between the units. Furthermore, the communication control unit 111 controls transfer, to the data processing unit 113, control information and management information to be advertised to another communication device.

The communication storage unit 112 holds information to be used by the communication control unit 111. Furthermore, the communication storage unit 112 holds a packet to be transmitted and a received packet. A transmission buffer that holds the packet to be transmitted is included in the communication storage unit 112.

At the time of transmission, the data processing unit 113 executes sequence management of the data held in the communication storage unit 112 and the control information and the management information received from the communication control unit 111, executes encryption processing and the like, and then adds a media access control (MAC) header and an error detection code to generate a packet. The data processing unit 113 executes concatenation processing on a plurality of the generated packets. Furthermore, at the time of reception, the data processing unit 113 executes deconcatenation processing on the MAC header of the received packet, analysis and error detection, and retransmission request operation reorder processing.

At the time of transmission, the signal processing unit 114 executes encoding, interleaving, modulation, and the like on a packet and adds a physical (PHY) header to generate a symbol stream. Furthermore, at the time of reception, the signal processing unit 114 analyzes a PHY header and executes demodulation, deinterleaving, decoding, and the like on a symbol stream to generate a packet. The signal processing unit 114 executes complex channel characteristic estimation and spatial separation processing as necessary.

At the time of transmission, the wireless interface unit 115 executes digital-analog signal conversion, filtering, up-conversion, and phase control on a symbol stream to generate a transmission signal. Furthermore, at the time of reception, the wireless interface unit 115 executes down-conversion, filtering, and analog-digital signal conversion on a received signal to generate a symbol stream.

The amplification unit 116 amplifies a signal input from the wireless interface unit 115 or the antenna 117. A part of the amplification unit 116 may be a component outside the wireless communication unit 101. Alternatively, the part of the amplification unit 116 may be included in the wireless interface unit 115.

The control unit 100 controls (the communication control unit 111 of) the wireless communication unit 101. The control unit 100 may also execute part of the operation of the communication control unit 111. The control unit 100 and the communication control unit 111 may be configured as one block.

The storage unit 102 holds information to be used by the control unit 100 and the wireless communication unit 101. The storage unit 102 may also execute part of the operation of the communication storage unit 112. The storage unit 102 and the communication storage unit 112 may be configured as one block.

The WAN communication unit 103 decodes a packet acquired from a backhaul and transfers the packet to the wireless communication unit 101 via the control unit 100. The packet transferred here may be in a form where an IP header remains as it is (access point mode) or a form where the IP header is decoded and removed by the WAN communication unit 103 (router mode).

Note that, in FIG. 2, it is assumed that the wireless communication unit 101 is configured as one integrated circuit (IC), but the configuration of the IC to which the present technology is applied is not limited to such a configuration. For example, the wireless interface unit 115 may be contained as another IC.

Overview of Present Technology

Meanwhile, as described above, in order to execute coordinated transmission between the access points AP, it is required that the wireless terminal STA periodically measure the channel and feedback the result. Such a series of flows is referred to as sounding, and the sounding processing is executed at regular intervals determined by the access point AP. For example, information indicating the intervals may be advertised by a Beamformed Link Maintenance field defined in Institute of Electrical and Electronics Engineers (IEEE) 802.11-2016.

At present, mainly as a sounding sequence for enabling coordinated transmission, the following two schemes are under consideration.

Example of Multi-AP Sounding

Figure 3:
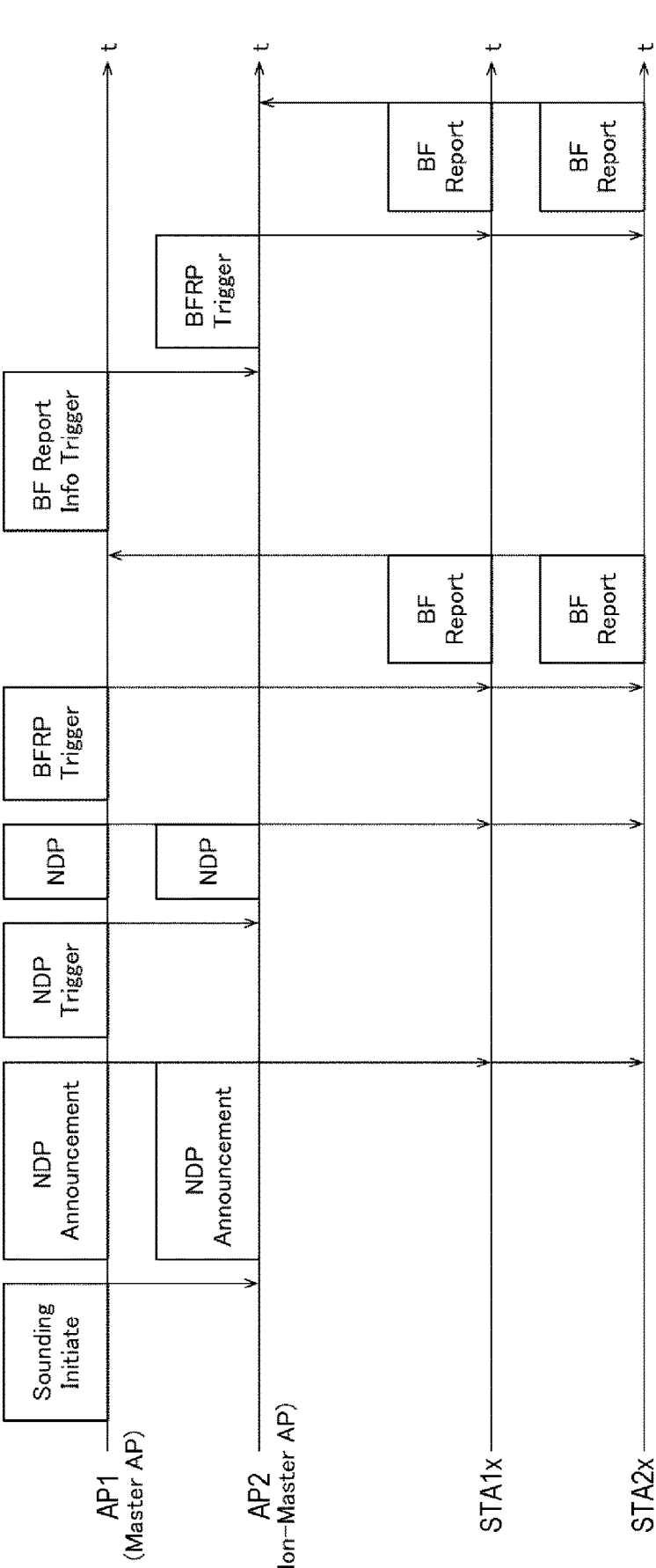
FIG. 3 is a diagram illustrating a first example of a sequence of Multi-AP Sounding.

FIG. 3 is a diagram illustrating a first example of a sequence of Multi-AP Sounding.

FIG. 3 illustrates the sequence of Multi-AP Sounding disclosed in Non-Patent Document 1 described above. In FIG. 3, the access point AP1 that initiates the sounding processing is referred to as a master AP, and the access point AP2 that initiates the sounding processing in accordance with an instruction from the access point AP1 is referred to as a non-master AP. Note that such roles may be switched for each processing. Furthermore, there may be a plurality of non-master APs.

First, the access point AP1 (master AP) transmits a Sounding Initiate frame to the access point AP2 (non-master AP). Thereafter, the access point AP1 and the access point AP2 simultaneously transmit an NDP Announcement (NDP-A) frame to their respective subordinate wireless terminals STA (STA1x, STA2x).

The NDP-A frame includes information regarding a wireless terminal STA that is requested to execute the sounding processing (STA information) and parameter information regarding information to be fed back. The access point AP1 and the access point AP2 transmit exactly the same NDP-A frame, so that the information to be transmitted in the frame needs to be exchanged between the access points AP in advance.

Next, after the access point AP1 transmits an NDP Trigger to the access point AP2, the access point AP1 and the access point AP2 transmit an NDP frame to their respective subordinate wireless terminals STA. The NDP Trigger is transmitted for synchronization of simultaneous transmission of the subsequent NDP frames, but may be omitted if there is no problem with synchronization accuracy.

Furthermore, the NDP frame transmitted by each access point AP is a signal that includes only a PHY preamble and is transmitted with a part (Long Training Field) of the PHY preamble multiplied by a training sequence that differs for each transmit antenna. Therefore, the access point AP1 and the access point AP2 transmit signals that are partly different from each other. The wireless terminal STA separates the NDP frame transmitted from each transmit antenna of each access point AP on the basis of the above-described training sequence and estimates a channel matrix.

Next, the access point AP1 and the access point AP2 each acquire feedback information from the wireless terminals STA. First, the access point AP1 transmits a BFRP Trigger frame to acquire BF Reports from the wireless terminals STA.

Here, the BFRP Trigger frame is used for advertisement of information necessary for the plurality of wireless terminals STA to simultaneously transmit the BF Reports (for example, information regarding a resource of uplink orthogonal frequency division multiple access (UL OFDMA) transmission). The BF Report transmitted from the wireless terminal STA has variations such as information representing the channel matrix itself and information regarding transmission weight information to be used by the access point AP and designates the format of the information to be fed back in the NDP-A frame.

After acquiring the BF Report, the access point AP1 transmits a BF Report Info Trigger to the access point AP2 to cause the access point AP2 to request the acquisition of the BF Report in a manner similar to the access point AP1. The access point AP2 transmits the BFRP Trigger frame to acquire the BF Reports from the wireless terminals STA.

Note that the operation illustrated in FIG. 3 is an example and should not be construed as limited to the example. For example, after the access point AP1 collects all the BF Reports, information regarding the BF Reports directly collected may be advertised from the access point AP1 to the access point AP2. Furthermore, in a case where there is only one subordinate wireless terminal STA, an instruction may be given to directly transmit the BF Report without transmitting the BFRP Trigger.

Figure 4:
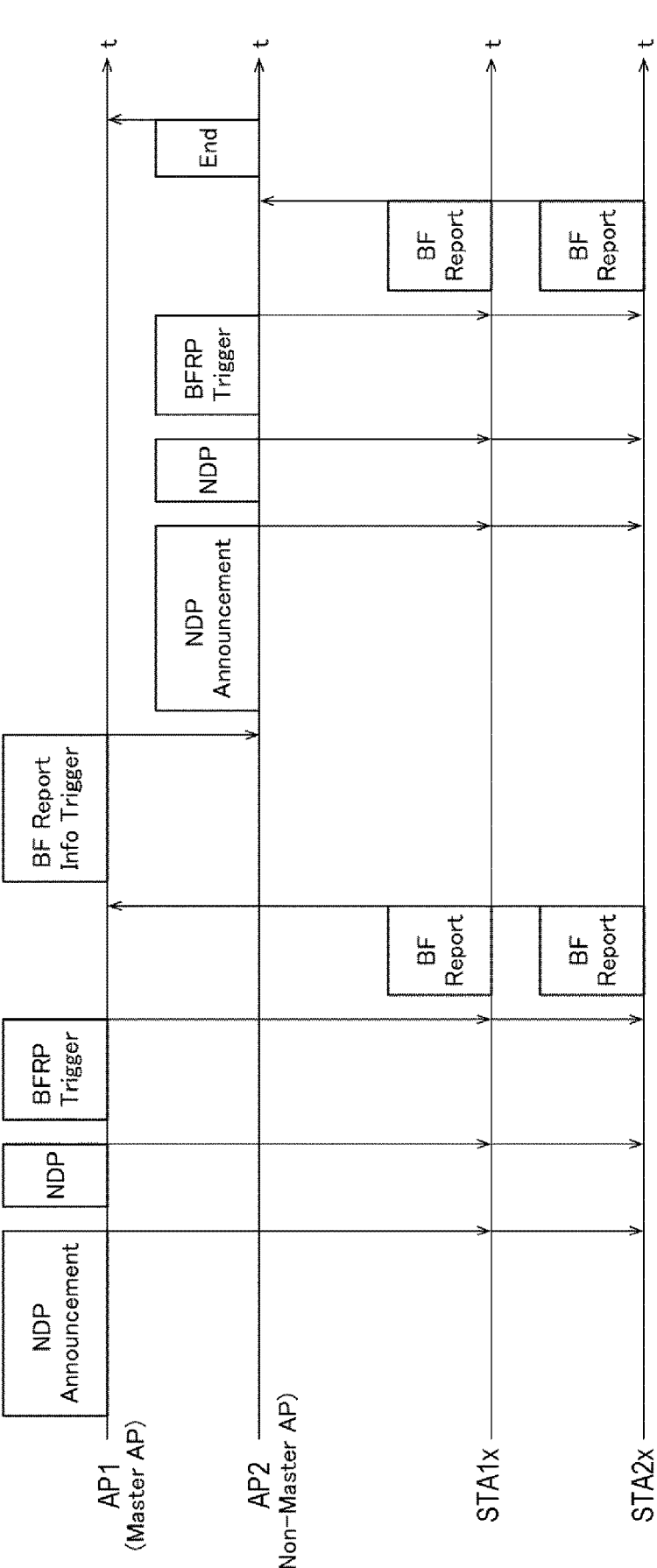
FIG. 4 is a diagram illustrating a second example of the sequence of Multi-AP Sounding.

FIG. 4 is a diagram illustrating a second example of the sequence of Multi-AP Sounding.

FIG. 4 illustrates the sequence of Multi-AP Sounding disclosed in Non-Patent Document 1 described above. A difference from the sequence in FIG. 3 described above is that the access point AP1 and the access point AP2 individually execute the sounding processing.

In the sequence in FIG. 4, basically, the same sequence as HE Sounding defined in IEEE 802.11ax is executed in each access point AP, but the following point is different. That is, the difference from HE Sounding is that each access point AP acquires the BF Report not only from a wireless terminal STA in the same cell but also from a wireless terminal STA belonging to another cell (for example, in a case of the access point AP1, the wireless terminal STA2x).

Note that sounding for enabling the JTX needs to follow the sequence in FIG. 3, but sounding for enabling the C-BF may follow either the sequence in FIG. 3 or the sequence in FIG. 4.

As described above, in a case where each access point AP acquires the BF Report from the wireless terminal STA and holds the BF Report, there is a possibility that a difference occurs in sounding execution time of the BF Report managed by each access point AP due to the occurrence of an error during sounding.

Patent Document 1 described above discloses an example where a coordination scheme is determined on the basis of whether or not the BF Report is acquired, but, for example, in the following case, it is possible to execute coordinated transmission on the basis of BF Report information acquired in the past, and it is possible to eliminate unnecessary retransmission and improve the establishment of opportunities to execute coordinated transmission.

That is, in a case where the degree of channel variation varies for each wireless terminal STA in a manner that depends on mobility or surrounding environment, it is assumed that the sounding processing is frequently executed along with a wireless terminal STA that is larger in degree of channel variation. In this case, for a wireless terminal STA that is smaller in degree of channel variation, the sounding processing is executed more than necessary, which makes a variable value in the BF Report transmitted for each processing small.

In general, it is assumed that an access point AP that wants to execute the JTX frequently executes the sounding processing because the JTX is more susceptible to channel variation than the C-BF. On the other hand, in a case where the C-BF is executed, it is conceivable that even if the access point AP does not use the latest BF Report and uses the past BF Report, the communication quality is not greatly affected.

Therefore, the present technology proposes a technique for improving a system throughput by determining whether or not to re-execute the Sounding Phase and determining whether or not to execute coordinated transmission during data transmission on the basis of the sounding execution time. Hereinafter, embodiments of the present technology will be described with reference to the drawings.

1. First Embodiment

Overall Sequence

Figure 5:
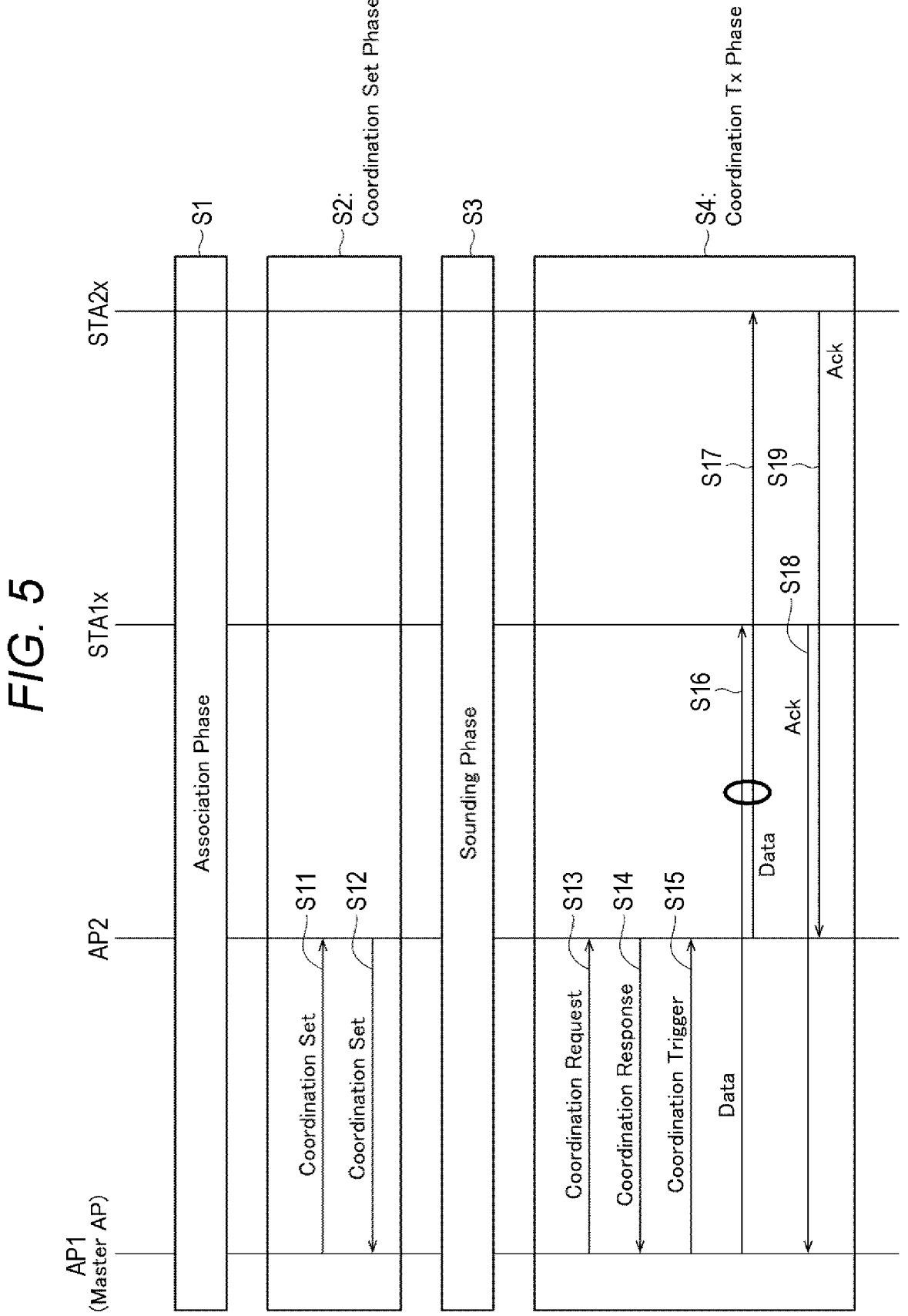
FIG. 5 is a sequence diagram illustrating exchanges between devices along a time axis in a first embodiment.

FIG. 5 is a sequence diagram illustrating exchanges between devices along a time axis in the first embodiment. With reference to this sequence diagram, a description will be given with the sequence divided into Association Phase (S1), Coordination Set Phase (S2), Sounding Phase (S3), and Coordination Tx Phase (S4).

In the Association Phase (S1), processing of establishing connection between the access point AP and the wireless terminal STA in the same cell and processing of establishing connection between the access points AP for coordinated operation are executed. Information regarding the wireless terminal STA in each basic service set (BSS) and capability information (for example, JTX operation is enabled, C-BF operation is enabled, and the like) of each device are exchanged in the Association Phase.

In the Coordination Set Phase (S2), the access points AP that operate in a coordinated manner each transmit a Coordination Set frame (S11, S12) to exchange threshold information regarding a threshold of the sounding execution time that is used in determining whether or not to re-execute sounding and determining whether or not to execute coordinated transmission. Details of the Coordination Set Phase will be described later.

In the Sounding Phase (S3), the measurement of the channel between the access point AP and the wireless terminal STA and the acquisition of feedback information are executed as described in FIG. 3 or 4. The present technology is characterized in that whether or not to retransmit the BF Report is determined on the basis of the threshold information regarding the threshold of the sounding execution time described above. Details of the Sounding Phase will be described later.

In the Coordination Tx Phase (S4), the access points AP execute data transmission in a coordinated manner (S15 to S19). The present technology is characterized in that the determination as to whether or not to execute coordinated transmission is made by transmitting, before the initiation of coordinated transmission, a Coordination Request frame and a Coordination Response frame (S13, S14) for exchange of the latest sounding execution time information. Note that FIG. 5 illustrates a sequence at the time of executing coordinated transmission. Details of the Coordination Tx Phase will be described later.

Note that, in FIG. 5, each Phase is executed when the access point AP1 operating as the master AP acquires a transmission right, but another access point AP (the access point AP2 in FIG. 5) may initiate each processing. Furthermore, any plurality of the Phases may be executed as processing in the same Phase if time permits.

Furthermore, the Coordination Set frame may be broadcast. In this case, the access point AP2 need not transmit the Coordination Set frame as a response to the signal transmitted from the access point AP1, and may transmit the Coordination Set frame when the access point AP2 acquires the transmission right.

(S2: Coordination Set Phase)

Details of the Coordination Set Phase (S2 in FIG. 5) in the overall sequence diagram will be described.

Figure 6:
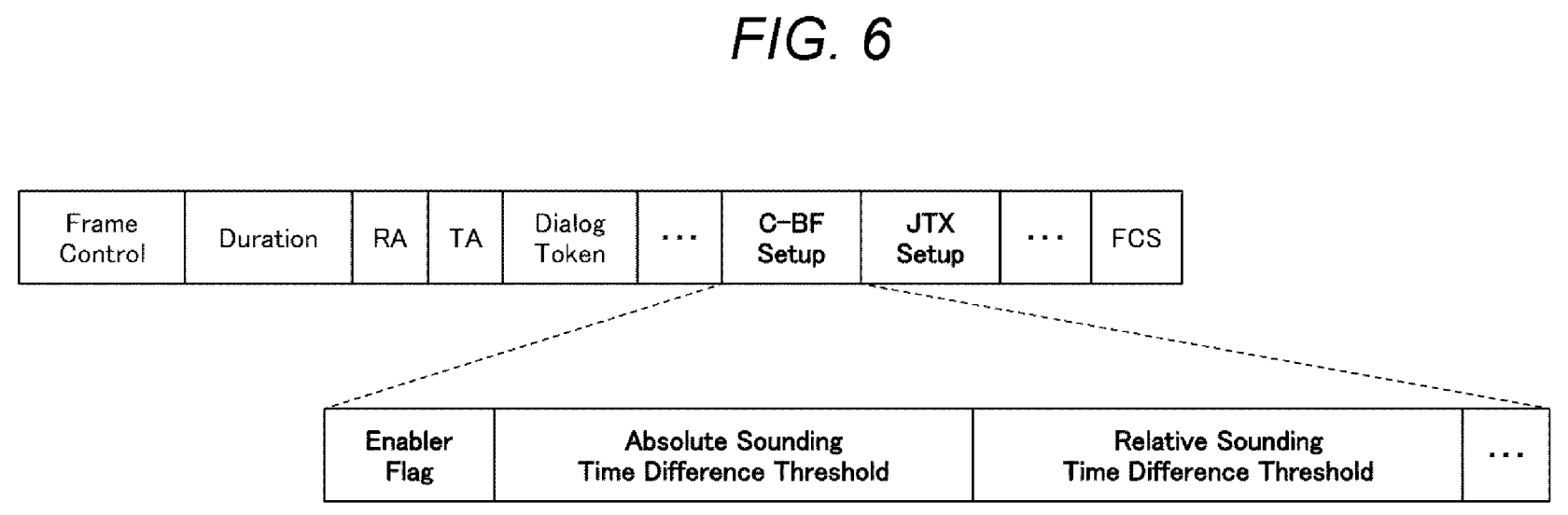

FIG. 6 is a diagram illustrating a configuration example of the Coordination Set frame.

The Coordination Set frame includes Frame Control, Duration, RA, TA, Dialog Token, C-BF Setup, JTX Setup, and FCS. Here, a configuration based on the Action Frame defined in IEEE 802.11 is illustrated.

The Frame Control includes information indicating the type of the frame. The Duration includes information indicating the length of the frame. The Receiver Address (RA) includes a receiver address. The Transmitter Address (TA) includes a transmitter address. The Dialog Token includes information indicating a processing number.

In FIG. 6, the C-BF Setup and the JTX Setup are included as Frame Body that is a body of information to be transmitted. Furthermore, the Frame Check Sequence (FCS) is added as an error correction code.

The C-BF Setup includes fields of Enabler Flag, Absolute Sounding Time Difference Threshold, and Relative Sounding Time Difference Threshold. The Enabler Flag includes information indicating whether or not the C-BF is enabled as a communication device.

The Absolute Sounding Time Difference Threshold includes a threshold that is used in determining whether or not BF Report information acquired in the past itself is outdated information. The threshold includes information regarding at least one of a time value or a time unit.

The Relative Sounding Time Difference Threshold includes a threshold that is used in determining whether or not an acquisition time difference between the BF Report information acquired in the past and a BF Report acquired by another access point AP is large. The threshold includes information regarding at least one of a time value or a time unit.

In a manner similar to the C-BF Setup, the JTX Setup includes fields of Enabler Flag, Absolute Sounding Time Difference Threshold, and Relative Sounding Time Difference Threshold, but the description thereof will be omitted to avoid a repetition.

Note that the two thresholds (the Absolute Sounding Time Difference Threshold, the Relative Sounding Time Difference Threshold) described above may be set uniformly or may be set differently for each wireless terminal STA. For example, these thresholds may be determined on the basis of information such as mobility of the wireless terminal STA or required signal to interference and noise (SINR). Furthermore, these thresholds may be periodically changed and advertised. That is, the threshold information can be a fixed value set for each access point AP or a variable value determined on the basis of the surrounding environment.

Note that the Coordination Set frame is not limited to the frame configuration illustrated in FIG. 6 and is only required to include at least one field of the C-BF Setup or the JTX Setup in the drawing, and for example, the Coordination Set frame may be broadcast by means of a beacon signal or the like including such information as the capability information. Furthermore, although the frame is assumed to be a MAC Frame in the description, the frame may be transmitted as a TCP/IP Frame as long as the above-described information is included.

(S3: Sounding Phase)

Figure 7:
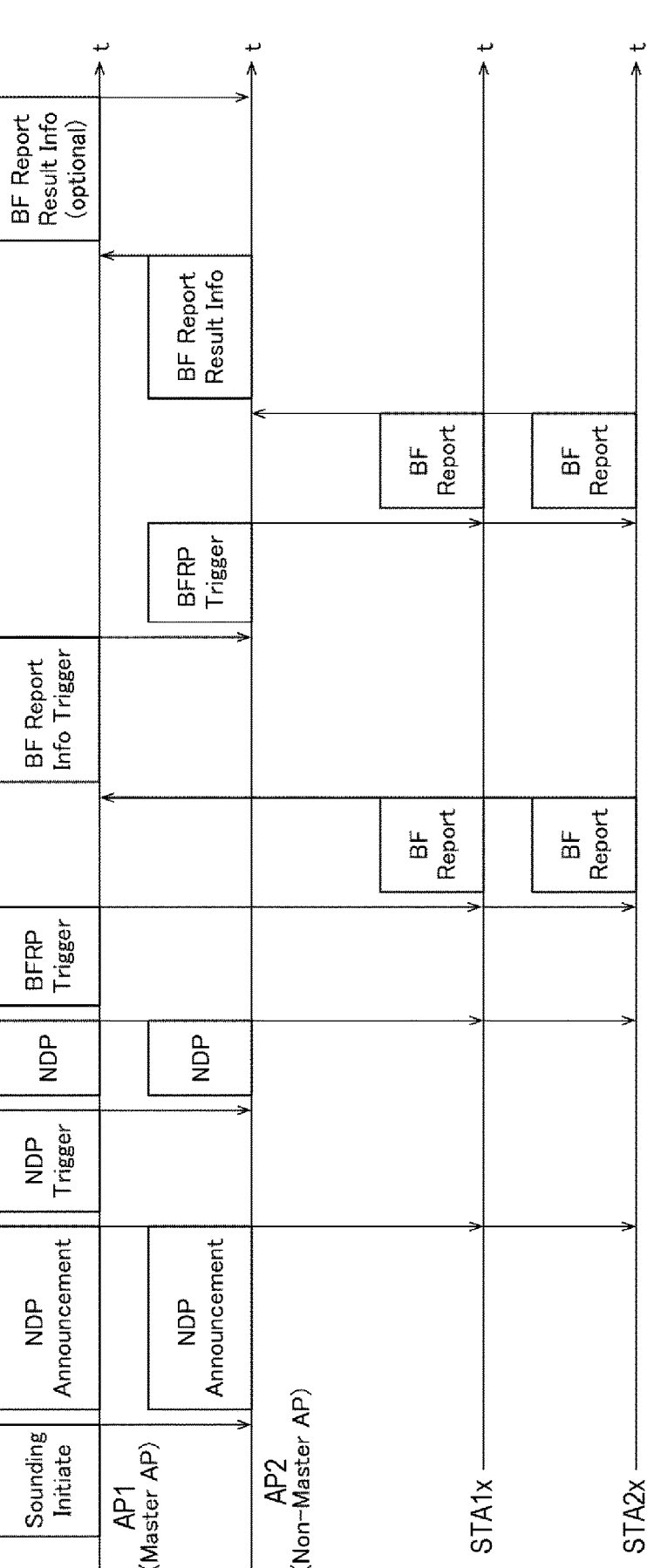
FIG. 7 is a diagram illustrating an example of a sequence of a Sounding Phase.

FIG. 7 is a diagram illustrating an example of a sequence of the Sounding Phase.

FIG. 7 illustrates a scheme obtained by adding, to the existing scheme described with reference to FIG. 3, transmission of a BF Report Result Info frame indicating a BF Report acquisition result from the access point AP2 to the access point AP1 and transmission of a similar BF Report Result Info frame from the access point AP1 to the access point AP2.

Note that the transmission of the BF Report Result Info frame from the access point AP1 to the access point AP2 in the second half of the exchange of the BF Report Result Info frame may be skipped in this phase.

Furthermore, although not illustrated in FIG. 7, the access point AP1 may control, after acquiring the BF Report Result Info from the access point AP2, to re-execute a part of the processing in the phase. The part of the processing mentioned here may be from retransmission of the NDP Announcement frame to the end, from retransmission of the NDP to the end, or from retransmission of the BFRP Trigger to the end.

Furthermore, although omitted here, the present technology is characterized that, similarly in the operation example of sounding based on the existing scheme described with reference to FIG. 4, after the access point AP2 acquires the BF Report, the BF Report Result Info frame rather than an End frame is transmitted to the access point AP2 to cause the access point AP1 to determine whether or not to re-execute sounding.

Figure 8:
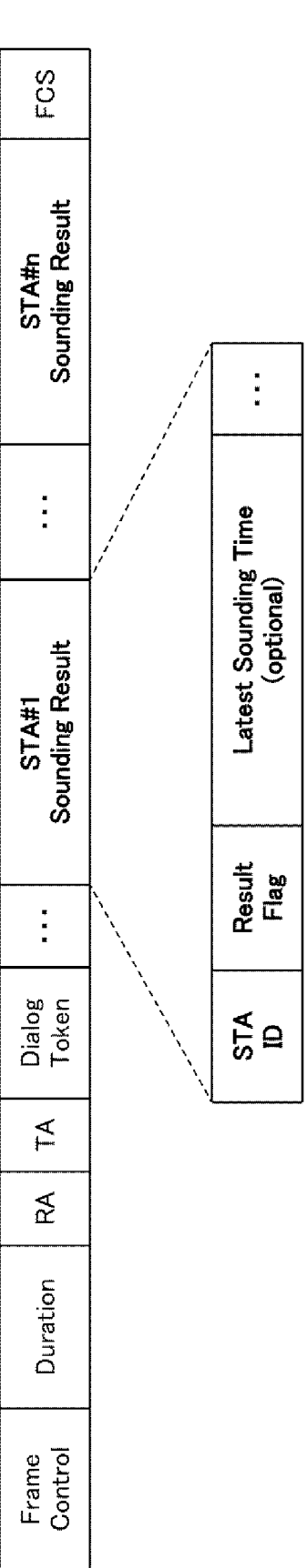
FIG. 8 is a diagram illustrating a configuration example of a BF Report Result Info frame.

FIG. 8 is a diagram illustrating a configuration example of the BF Report Result Info frame.

The BF Report Result Info frame include Frame Control, Duration, RA, TA, Dialog Token, STA Sounding Result, and FCS. Here, a configuration based on the Action Frame defined in IEEE 802.11 is illustrated.

The Frame Control includes information indicating the type of the frame. The Duration includes information indicating the length of the frame. The RA contains a receiver address. The TA contains a transmitter address. The Dialog Token includes information indicating a processing number.

In FIG. 8, fields of the Sounding Result as many as the number of wireless terminals STA are included as Frame Body that is a body of information to be transmitted. Furthermore, the FCS is added as an error correction code. The Sounding Result includes fields of STA ID, Result Flag, and Latest Sounding Time.

The STA ID includes identifier information of the wireless terminal STA. For example, the identifier information includes Association ID (AID), a number newly assigned by means of the NDP-A frame, and the like. Note that, in a case where the order of STA Info of the NDP-A frame is applied as it is, this field need not be provided.

The Result Flag includes flag information indicating whether or not the BF Report has been correctly acquired from the wireless terminal STA.

The Latest Sounding Time includes information regarding a sounding execution time when the BF Report is last acquired from the wireless terminal STA. The sounding execution time may be a time when the NDP is transmitted or a time when the BF Report is acquired, but needs to be consistent among all the access points AP. The Latest Sounding Time is basically required when Result Flag=false, but may be stored and advertised when Result Flag=true.

Note that the BF Report Result Info frame is not limited to the frame configuration illustrated in FIG. 8 and is only required to include at least one field of the Sounding Result in the drawing. Furthermore, although the frame is assumed to be a MAC Frame in the description, the frame may be transmitted as a TCP/IP Frame as long as the above-described information is included.

Next, a processing flow of the master AP in the Sounding Phase will be described with reference to a flowchart in FIG. 9.

First, the access point AP1 operating as the master AP acquires, after transmitting the NDP, the BF Reports from the wireless terminal STA group including the wireless terminal STA serving as a data receiver (S31, S32). Note that, regarding the transmission of the NDP, the master AP (access point AP1) may transmit the NDP in cooperation with another access point (access point AP2) or may transmit the NDP independently.

Thereafter, the master AP transmits the BF Report Info Trigger to another access point AP (S33) to acquire the BF Report Result Info from the another access point AP (S34).

Note that, in a case where there are two or more access points AP (hereinafter, referred to as coordination candidates AP) that are coordination candidates, the master AP repeats the transmission of the BF Report Info Trigger and the acquisition of the BF Report Result Info from another access point AP as long as time permits.

Next, in a case where the master AP determines that, after collecting the BF Report Result Info from all the access points AP, all the access points AP have successfully acquired the BF Reports from all the wireless terminals STA (No in S35), the processing proceeds to step S36. In this case, the master AP may advertise the final result of the BF Report to another access point AP by means of the BF Report Result Info (Yes in S36, S37), or may simply terminate the processing (No in S36).

On the other hand, in a case where it is determined that there is an access point AP that has failed to successfully acquire the BF Report from any wireless terminal STA (Yes in S35) and there is a margin in the transmission time (transmission opportunity (TXOP)) (Yes in S38), the processing proceeds to step S39. The access point AP1 (master AP) determines whether or not to re-execute the sounding processing in this phase on the basis of the Report acquisition times (sounding execution time (Latest Sounding Time) of the wireless terminal STA) of all the access points AP.

In the execution determination in step S39, for example, in a case where the following two conditions ((a), (b)) are satisfied (No in S39), the final result of the BF Report is advertised to another access point AP by means of the BF Report Result Info without re-execution of sounding (Yes in S36, S37), or the processing is simply terminated (No in S36).

(a) A difference between the Latest Sounding Time of a certain wireless terminal STA held by an access point AP that has failed to acquire the BF Report of the wireless terminal STA and the current time is greater than or equal to a threshold corresponding to the Absolute Sounding Time Difference Threshold.

(b) A difference between the Latest Sounding Time of a certain wireless terminal STA held by an access point AP that has failed to acquire the BF Report of the wireless terminal STA and the Latest Sounding Time of the wireless terminal STA held by another access point AP is greater than or equal to a threshold corresponding to the Relative Sounding Time Difference Threshold.

Furthermore, in a case where at least any one of the above-described two conditions ((a), (b)) is not satisfied (Yes in S39), the master AP re-transmits the NDP in cooperation with another access point AP to acquire the BF Report (S40, S41). Note that whether or not to transmit the NDP is determined as desired. Then, the processing returns to step S35 and the subsequent processes are repeated.

(S4: Coordinated Tx Phase)

Figure 10:
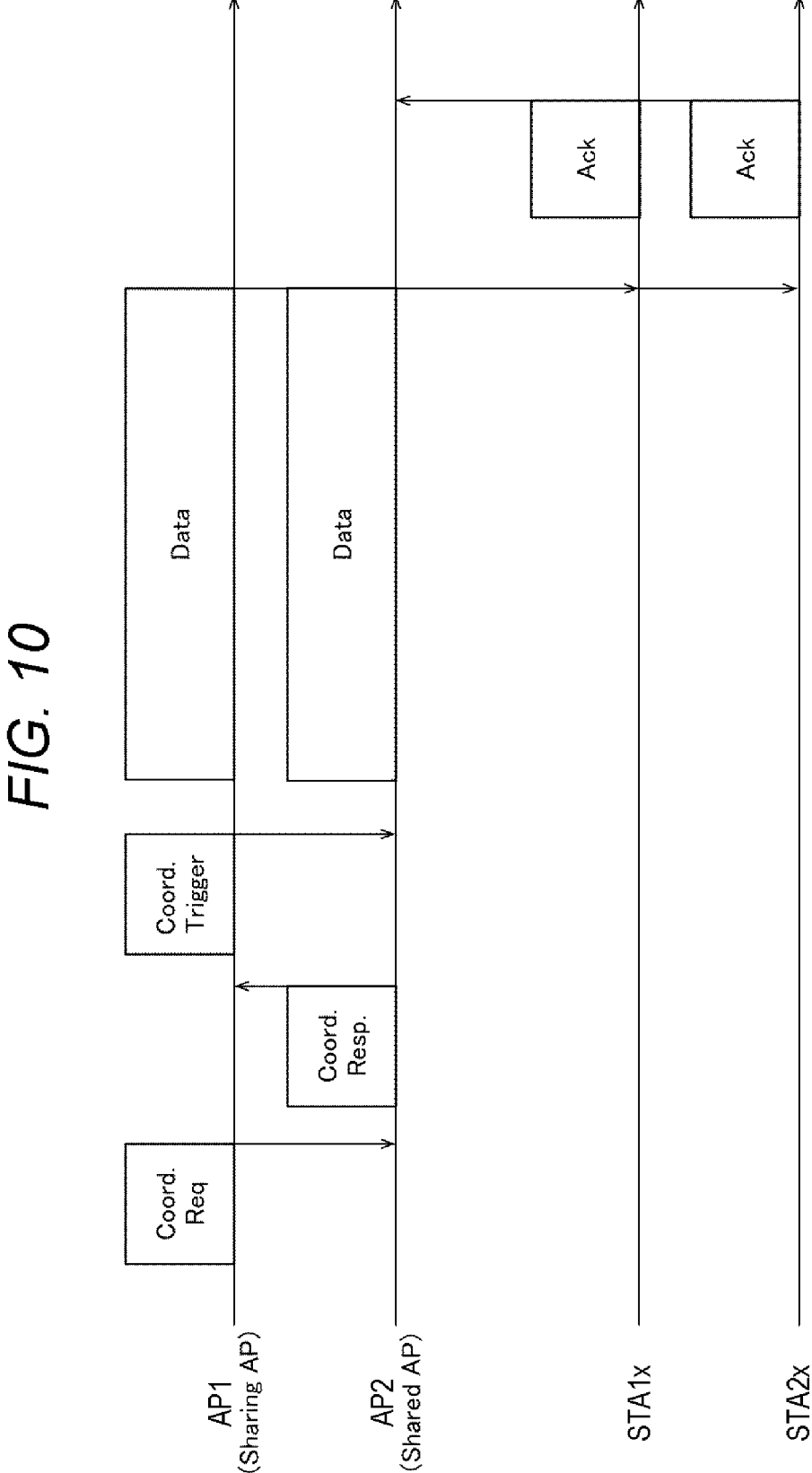
FIG. 10 is a diagram illustrating an example of a sequence of a Coordinated Tx Phase.

FIG. 10 is a diagram illustrating an example of a sequence of the Coordinated Tx Phase.

In FIG. 10, before the initiation of coordinated transmission, the Coordination Request frame (Coord.Req) and the Coordination Response frame (Coord.Resp) are exchanged between an access point AP that has acquired the transmission right (hereinafter, referred to as a sharing AP) and an access point AP that transmits data in coordination with the sharing AP (hereinafter, referred to as a shared AP).

The present technology is characterized in that the Coordination Request frame and the Coordination Response frame are transmitted for exchange of the latest sounding execution time information, and a determination is made as to whether or not to execute coordinated transmission. FIG. 10 illustrates a sequence at the time of executing coordinated transmission, and an acknowledgement (Ack) is returned from the wireless terminal STA after the access points AP transmit data in coordination with each other.

Note that FIG. 10 illustrates a scenario where only two access points AP of the access point AP1 and the access point AP2 are present, but, in a case where another access point AP that is a coordination candidate is present, transmission parameter information necessary for multiuser communication may be included in the Coordination Request frame so as to allow the Coordination Response frame to be transmitted by means of the multiuser communication.

Figure 11:
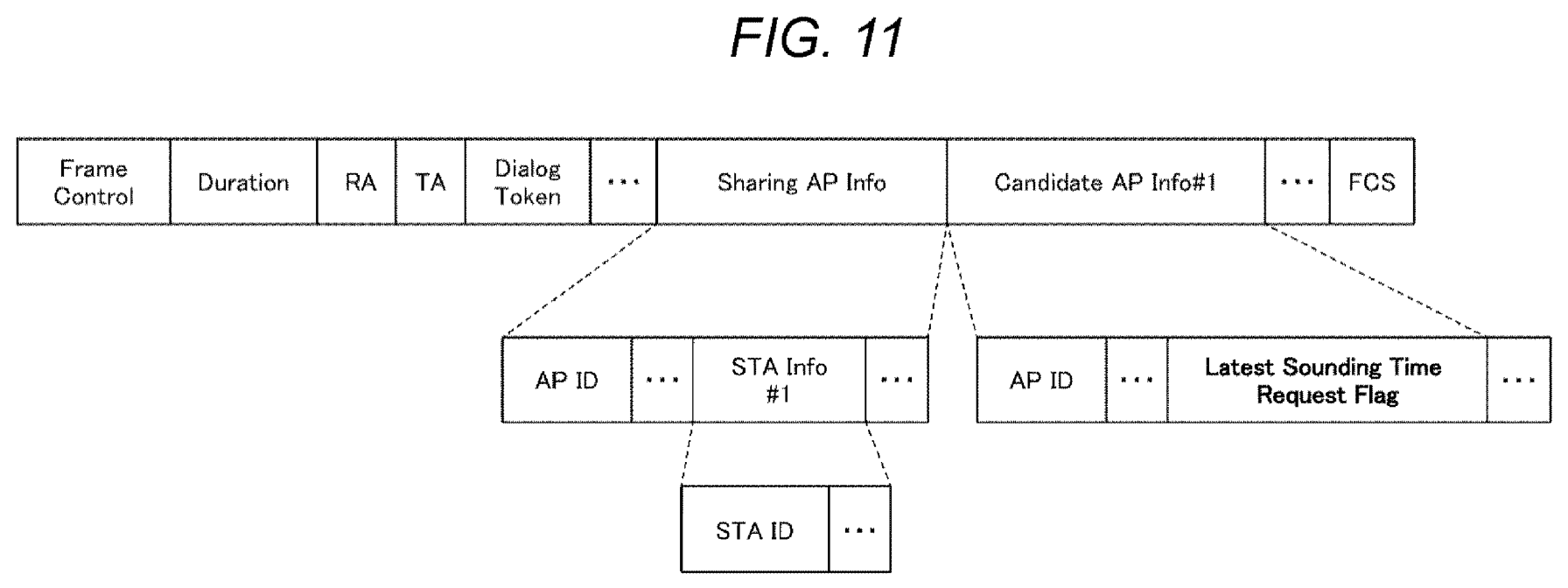

FIG. 11 is a diagram illustrating a configuration example of the Coordination Request frame.

The Coordination Request frame includes Frame Control, Duration, RA, TA, Dialog Token, Sharing AP Info, Candidate AP Info, and FCS. Here, a configuration based on the Action Frame defined in IEEE 802.11-2016 is illustrated.

The Frame Control includes information indicating the type of the frame. The Duration includes information indicating the length of the frame. The RA contains a receiver address. The TA contains a transmitter address. The Dialog Token includes information indicating a processing number.

In FIG. 11, the Sharing AP Info and the Candidate AP Info are included as Frame Body that is a body of information to be transmitted. Furthermore, the FCS is added as an error correction code.

The Sharing AP Info includes an information group regarding the access point AP that has acquired the transmission right. The Sharing AP Info includes fields of AP ID and STA Info.

The AP ID includes identifier information of itself. The STA Info includes an information group regarding a wireless terminal STA to which transmission is intended, the information group including the identifier information (STA ID) of the wireless terminal STA.

The Candidate AP Info includes an information group regarding an access point AP that is a coordination candidate. The Candidate AP Info includes fields of AP ID and Latest Sounding Time Request Flag.

The AP ID includes the identifier information of the access point AP that is a coordination candidate. The Latest Sounding Time Request Flag includes flag information indicating whether or not to cause the access point AP to advertise, by means of a response signal, the latest sounding execution time recorded by the access point AP for each wireless terminal STA to which transmission is intended.

The sounding execution time may be a time when the NDP is transmitted or a time when the BF Report is acquired, but needs to be consistent among all the access points AP. Note that in a case where the information has already been acquired from all the access points AP in the Sounding Phase (S3), the flag may be set to false.

Note that the Coordination Request frame is not limited to the frame configuration illustrated in FIG. 11 and is only required to include at least information of the Latest Sounding Time Request Flag in the drawing. Furthermore, although the frame is assumed to be a MAC Frame in the description, the frame may be transmitted as a TCP/IP Frame as long as the above-described information is included.

Figure 12:
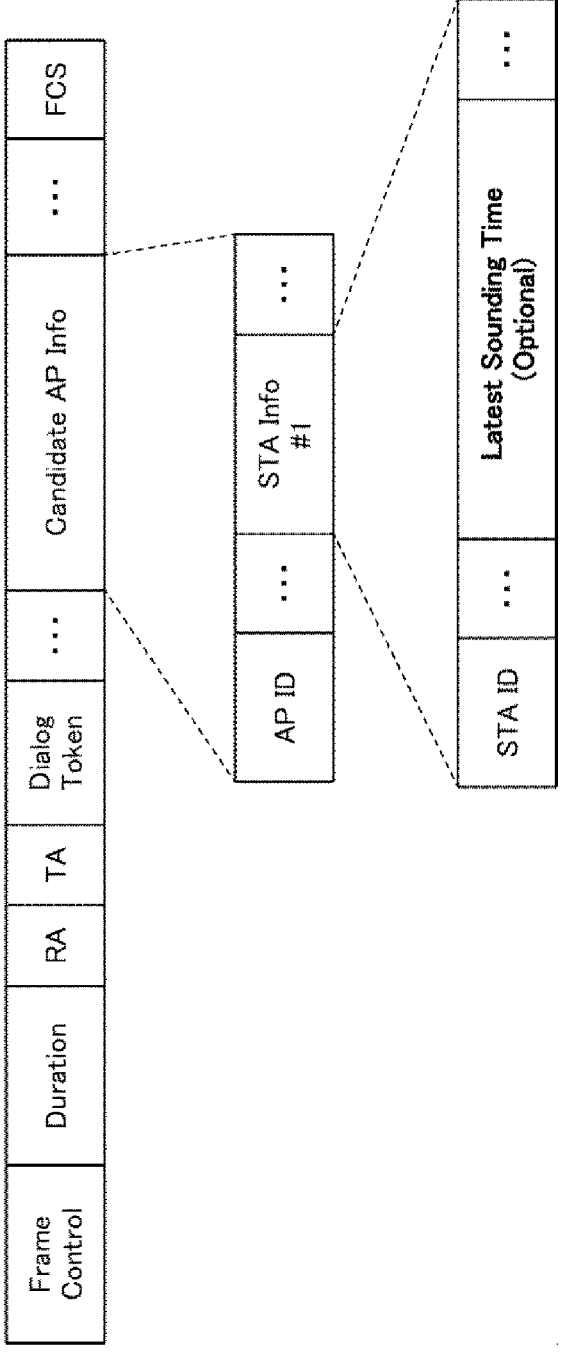
FIG. 12 is a diagram illustrating a configuration example of a Coordination Response frame.

FIG. 12 is a diagram illustrating a configuration example of the Coordination Response frame.

The Coordination Response frame includes Frame Control, Duration, RA, TA, Dialog Token, Candidate AP Info, and FCS. Here, a configuration based on the Action Frame defined in IEEE 802.11-2016 is illustrated.

The Frame Control includes information indicating the type of the frame. The Duration includes information indicating the length of the frame. The RA contains a receiver address. The TA contains a transmitter address. The Dialog Token includes information indicating a processing number.

In FIG. 12, the Candidate AP Info is included as Frame Body that is a body of information to be transmitted. Furthermore, the FCS is added as an error correction code.

The Candidate AP Info is an information group regarding a coordination candidate AP. The Candidate AP Info includes fields of AP ID and STA Info.

The AP ID includes identifier information of the coordination candidate AP. The STA Info includes an information group regarding the wireless terminal STA. The STA Info includes fields of STA ID and Latest Sounding Time.

The STA ID includes identifier information of the wireless terminal STA to which transmission is intended. The Latest Sounding Time includes the sounding execution time information when the BF Report is last acquired from the wireless terminal STA. The sounding execution time may be a time when the NDP is transmitted or a time when the BF Report is acquired, but needs to be consistent among all the access points AP.

Note that the Coordination Response frame is not limited to the frame configuration illustrated in FIG. 12 and is only required to include at least information of the Latest Sounding Time in the drawing. Furthermore, although the frame is assumed to be a MAC Frame in the description, the frame may be transmitted as a TCP/IP Frame as long as the above-described information is included.

Next, a processing flow of the sharing AP in the Coordinated Tx Phase will be described with reference to a flowchart in FIG. 13.

Figure 13:
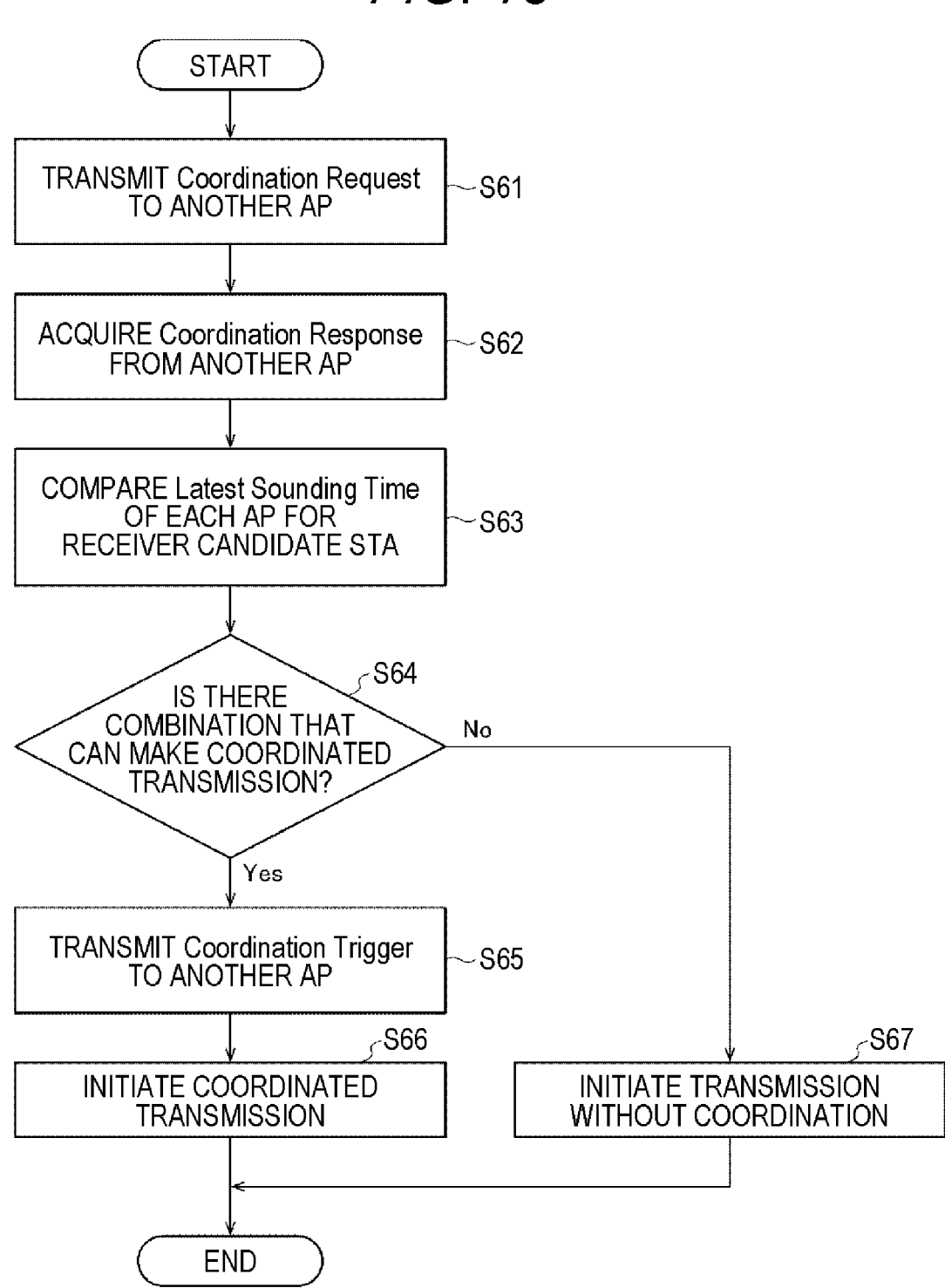
FIG. 13 is a flowchart illustrating a processing flow of a sharing AP in the Coordinated Tx Phase.

FIG. 13 illustrates that a similar processing flow is executed regardless of whether the master AP operates as the sharing AP or the non-master AP operates as the sharing AP.

First, the sharing AP transmits the Coordination Request frame to another access point AP (coordination candidate AP) (S61), and acquires the Coordination Response frame from the another access point AP (coordination candidate AP) (S62).

Next, the sharing AP compares the Latest Sounding Time of each access point AP for a wireless terminal STA (receiver candidate STA) as a candidate for receiver (S63) to search for a combination of a transmitter and a receiver that can execute coordinated transmission (S64).

In a case where there is a combination that can execute coordinated transmission (Yes in S64), the sharing AP initiates coordinated transmission after transmitting the Coordination Trigger frame to a corresponding another access point AP (S65, S66). On the other hand, in a case where there is no combination that can execute coordinated transmission, the sharing AP initiates data transmission on the basis of the existing scheme without coordination (S67).

As criteria for determining whether or not there is a combination that can execute coordinated transmission in step S64, for example, when the following two conditions ((c), (d)) are all satisfied in the sharing AP, any shared AP (any access point AP among access points AP that have returned the Coordination Response), and any one or more of the wireless terminals STA serving as receivers, it can be determined that there is a combination that can execute coordinated transmission.

(c) In any access point AP, a difference between the Latest Sounding Time of the wireless terminal STA serving as a receiver and the current time is less than a threshold corresponding to the Absolute Sounding Time Difference Threshold.

(d) A difference between the Latest Sounding Times of the wireless terminal STA serving as a receiver held by the access points AP is less than a threshold corresponding to the Relative Sounding Time Difference Threshold.

Note that, in a case where the sharing AP is the master AP, it is assumed that the access point AP has already acquired information regarding the Latest Sounding Time of each wireless terminal STA in the Sounding Phase (S3) even before acquiring the Coordination Response frame. In this case, with the Latest Sounding Time Request Flag in the Coordination Request frame in FIG. 11 set to "false", the frame may be transmitted.

Furthermore, even in a case where the sharing AP is the non-master AP, when the BF Report Result Info is shared with the master AP at the end of the Sounding Phase (S3), it is assumed that the sharing AP has already acquired the information regarding the Latest Sounding Time of each wireless terminal STA. In this case as well, with the Latest Sounding Time Request Flag in the Coordination Request frame in FIG. 11 set to "false", the frame may be transmitted.

Furthermore, the sharing AP may determine the coordination scheme in parallel with the search for a combination that can execute coordinated transmission. For example, in a case where it is determined that coordinated transmission cannot be executed under the JTX, but can be executed under the C-BF on the basis of the determination criteria of (c) and (d) described above, the coordinated transmission may be initiated under the coordination scheme set to the C-BF.

Moreover, after determining in advance at least one of the wireless terminal STA serving as a receiver, the access point AP that operates in a coordinated manner, or the coordination scheme, the sharing AP may determine whether or not to execute coordinated transmission or determine information other than scheduling information other than the determined information using information regarding the Latest Sounding Time. As described above, a scheduling algorithm of the sharing AP depends on the implementation, but in the present technology, the determination as to whether or not to execute coordinated transmission using the Latest Sounding Time is the same as described above.

As described above, in the first embodiment, the configuration and the processing for determining whether or not to re-execute sounding and determining whether or not to execute coordinated transmission on the basis of the sounding execution time (sounding time) have been described. In the communication device 10 that executes such processing as described above, the following processing is executed by at least one of the control unit 100 or the communication control unit 111.

That is, the communication device 10 (for example, the access point AP) exchanges a first information (for example, the Coordination Set frame) that is used when a plurality of communication devices (for example, a plurality of access points AP) executes coordinated transmission with a first another communication device (for example, another access point AP) by means of wireless communication, and performs control to share threshold information regarding the sounding time (for example, the Absolute Sounding Time Difference Threshold, the Relative Sounding Time Difference Threshold) with the first another communication device on the basis of the first information.

For example, whether or not to re-execute sounding or whether or not to execute coordinated transmission is determined on the basis of the threshold information. The threshold information is time information and includes at least one of an absolute value of the sounding time (for example, the Absolute Sounding Time Difference Threshold) or a relative value of the sounding time (for example, the Relative Sounding Time Difference Threshold).

Figure 9:
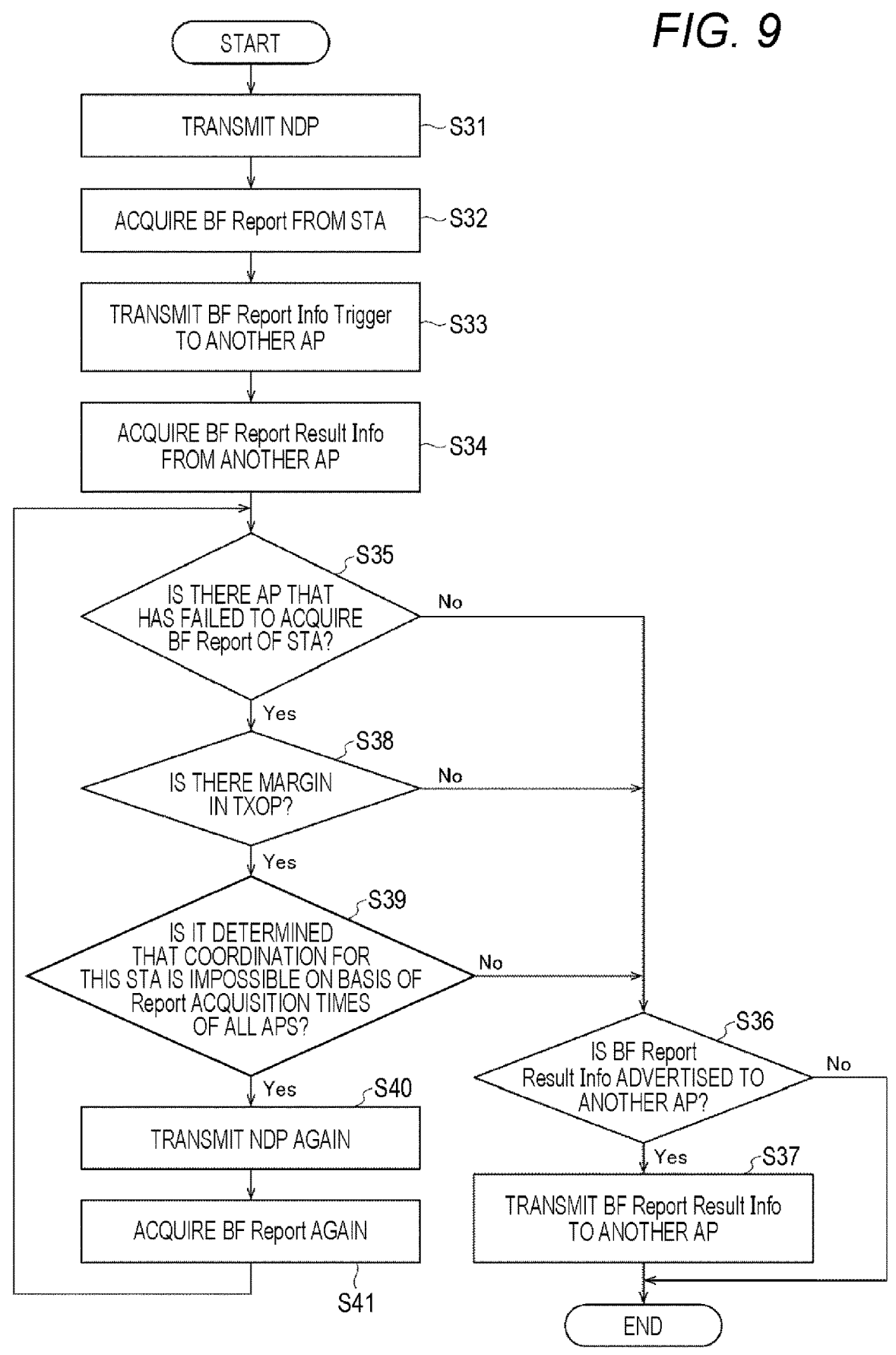
FIG. 9 is a flowchart illustrating a processing flow of a master AP in the Sounding Phase.

Furthermore, the communication device 10 (for example, the access point AP) determines whether or not to re-execute sounding in the same processing on a second another communication device (for example, the wireless terminal STA) serving as a data receiver during sounding from which the communication device 10 has failed to acquire second information (for example, the BF Report), on the basis of the sounding time information (for example, the Latest Sounding Time) of the second another communication device and the threshold information (for example, the Absolute Sounding Time Difference Threshold, the Relative Sounding Time Difference Threshold) for each of the plurality of communication devices (for example, the plurality of access points AP) that operates in a coordinated manner (S39 in FIG. 9).

At this time, the communication device 10 (for example, the access point AP) collects, from the first another communication device (for example, another access point AP), a third information (for example, the BF Report Result Info frame) including an acquisition status (for example, the Result Flag) of the second information (for example, the BF Report) (S34 in FIG. 9). Furthermore, the communication device 10 (for example, the access point AP) collects, from the first another communication device, the third information (for example, the BF Report Result Info frame) including the sounding time information (for example, the Latest Sounding Time) when the second information (for example, the BF Report) is last acquired (S34 in FIG. 9).

Furthermore, the communication device 10 (for example, the access point AP) determines whether or not to execute coordinated transmission to the second another communication device (for example, the wireless terminal STA) serving as a data receiver during data transmission on the basis of the sounding time information (for example, the Latest Sounding Time) of the second another communication device and the threshold information (for example, the Absolute Sounding Time Difference Threshold, the Relative Sounding Time Difference Threshold) for each of the plurality of communication devices (for example, the plurality of access points AP) that operates in a coordinated manner (S64 in FIG. 13). At this time, the communication device 10 (for example, the access point AP) determines the coordination scheme (for example, the JTX, the C-BF) or the second another communication device (for example, the wireless terminal STA) serving as a receiver on the basis of the sounding time information and the threshold information.

For example, the following effects can be expected by employing the configuration in the first embodiment. That is, it is possible to improve the system throughput by determining whether or not to re-execute the Sounding Phase and determining whether or not to execute coordinated transmission during data transmission on the basis of the sounding execution time.

More specifically, the access point AP that executes coordinated transmission confirms, when having failed to acquire the BF Report from the wireless terminal STA in the sounding processing, whether or not the information acquired in the past can be used, which allows an increase in coordinated transmission opportunity and further allows a significant contribution to an improvement in the system throughput because of less frequency of sounding.

For example, in a case where the BF Report for each wireless terminal STA is successfully acquired at a rate of 50%, when the expected number of times of transmission of the BF Report is two times, and moreover, there is no margin in transmission possible time and it is therefore difficult to retransmit the BF Report in the same processing, it is necessary to wait until the next transmission right is acquired, so that the time required for acquiring the BF Report becomes longer. On the other hand, with the present technology applied, for example, if it can be confirmed that one past BF Report can be used as it is, the expected number of times of transmission of the BF Report becomes 1.33 times (retransmission probability is equivalently 25%), and the sounding time can be reduced by nearly 30% accordingly. Furthermore, since the past BF Report information can be effectively used by switching the coordination scheme or the wireless terminal STA serving as a receiver in accordance with the BF Report acquisition status, the time required for sounding can be reduced.

2. Second Embodiment

In a second embodiment, a description will be given of a configuration where a determination as to whether or not to re-execute sounding and a determination as to whether or not to execute coordinated transmission are made using a Sounding Dialog Token instead of time information. The Sounding Dialog Token corresponds to a processing number determined for each sounding processing, and the number advertised by means of the NDP-A frame is used until the end of a series of sounding processing. In the second embodiment, on the premise that the Sounding Dialog Token is incremented each time the Sounding Dialog Token is used, information regarding the number of times of sounding execution is used.

A flow of the overall sequence in the second embodiment is basically similar to the overall sequence (FIG. 5) in the first embodiment, so that the description of common parts will be omitted as appropriate.
(S2: Coordination Set Phase)

Figure 14:
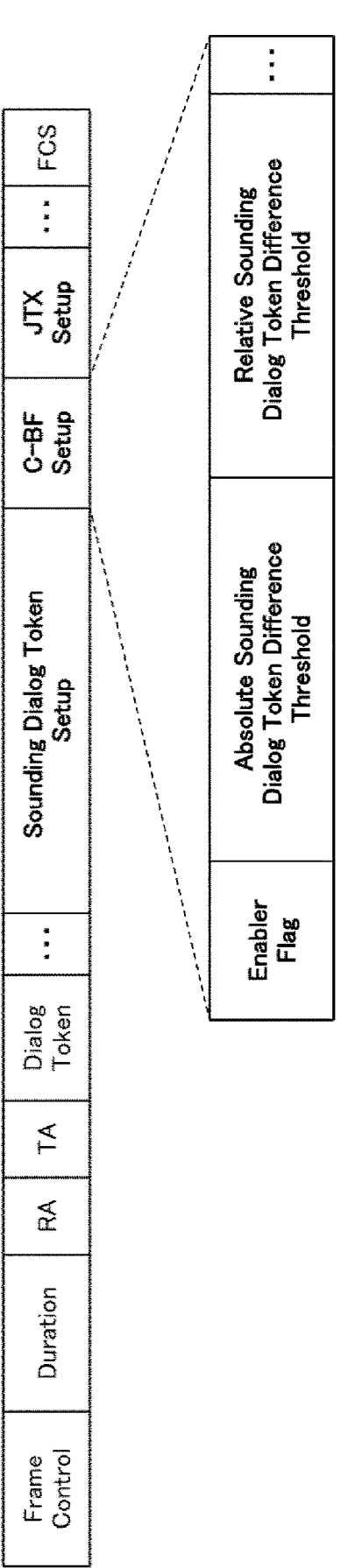
FIG. 14 is a diagram illustrating a configuration example of the Coordination Set frame.

FIG. 14 is a diagram illustrating a configuration example of the Coordination Set frame.

The Coordination Set frame in the second embodiment is different from the Coordination Set frame in the first embodiment (FIG. 6) in that two pieces of threshold information are represented by the Dialog Token and a Sounding Dialog Token Setup field is additionally provided.

That is, the Coordination Set frame includes, as Frame Body, Sounding Dialog Token Setup, C-BF Setup, and JTX Setup. The Sounding Dialog Token Setup includes initialization information of the Sounding Dialog Token that is used between the access points AP.

The C-BF Setup includes fields of Enabler Flag, Absolute Sounding Dialog Token Difference Threshold, and Relative Sounding Dialog Token Difference Threshold. The Enabler Flag includes information indicating whether or not the C-BF is enabled as a communication device.

The Absolute Sounding Dialog Token Difference Threshold includes a threshold that is used in determining whether or not BF Report information acquired in the past itself is outdated information. As the threshold, a numerical value indicating a difference between the Dialog Tokens is included.

The Relative Sounding Dialog Token Difference Threshold includes a threshold that is used in determining whether or not an acquisition time difference between the BF Report information acquired in the past and a BF Report acquired by another access point AP is large. As the threshold, a numerical value indicating a difference between the Dialog Tokens is included.

In a manner similar to the C-BF Setup, the JTX Setup includes fields of Enabler Flag, Absolute Sounding Dialog Token Difference Threshold, and Relative Sounding Dialog Token Difference Threshold, but the description thereof will be omitted to avoid a repetition.

Note that the two thresholds (the Absolute Sounding Dialog Token Difference Threshold and the Relative Sounding Dialog Token Difference Threshold) described above may be set uniformly or may be set differently for each wireless terminal STA. For example, it may be determined on the basis of information such as mobility of the wireless terminal STA and required SINR. Furthermore, these thresholds may be periodically changed and advertised.

(S3: Sounding Phase)

The sequence of the Sounding Phase in the second embodiment is similar to the sequence of the Sounding Phase in the first embodiment (FIG. 7), so that the description thereof will be omitted.

Figure 15:
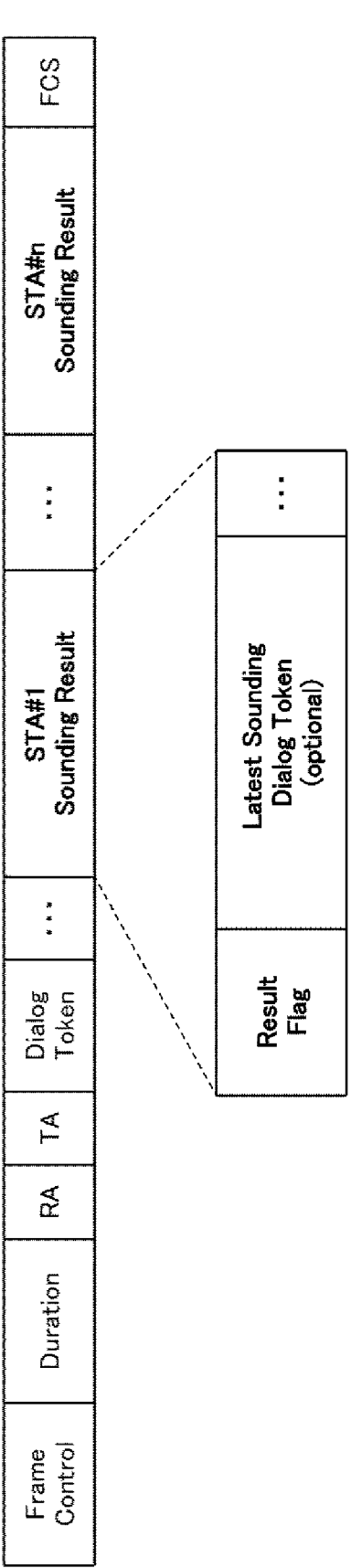
FIG. 15 is a diagram illustrating a configuration example of the BF Report Result Info frame.

FIG. 15 is a diagram illustrating a configuration example of the BF Report Result Info frame.

The BF Report Result Info frame in the second embodiment is different from the BF Report Result Info frame (FIG. 8) in the first embodiment in that the Latest Sounding Time is replaced with Latest Sounding Dialog Token.

That is, the BF Report Result Info frame includes, as Frame Body, Sounding Results as many as the number of wireless terminals STA, but each Sounding Result includes a field of the Latest Sounding Dialog Token together with the Result Flag.

The Result Flag includes flag information indicating whether or not the BF Report has been correctly acquired from the wireless terminal STA.

The Latest Sounding Dialog Token includes number information of sounding processing when the BF Report is last acquired from the wireless terminal STA. The Latest Sounding Dialog Token is basically required when Result Flag=false, but may be stored and advertised even when Result Flag=true.

Next, a processing flow of the master AP in the Sounding Phase will be described with reference to a flowchart in FIG. 16.

Figure 16:
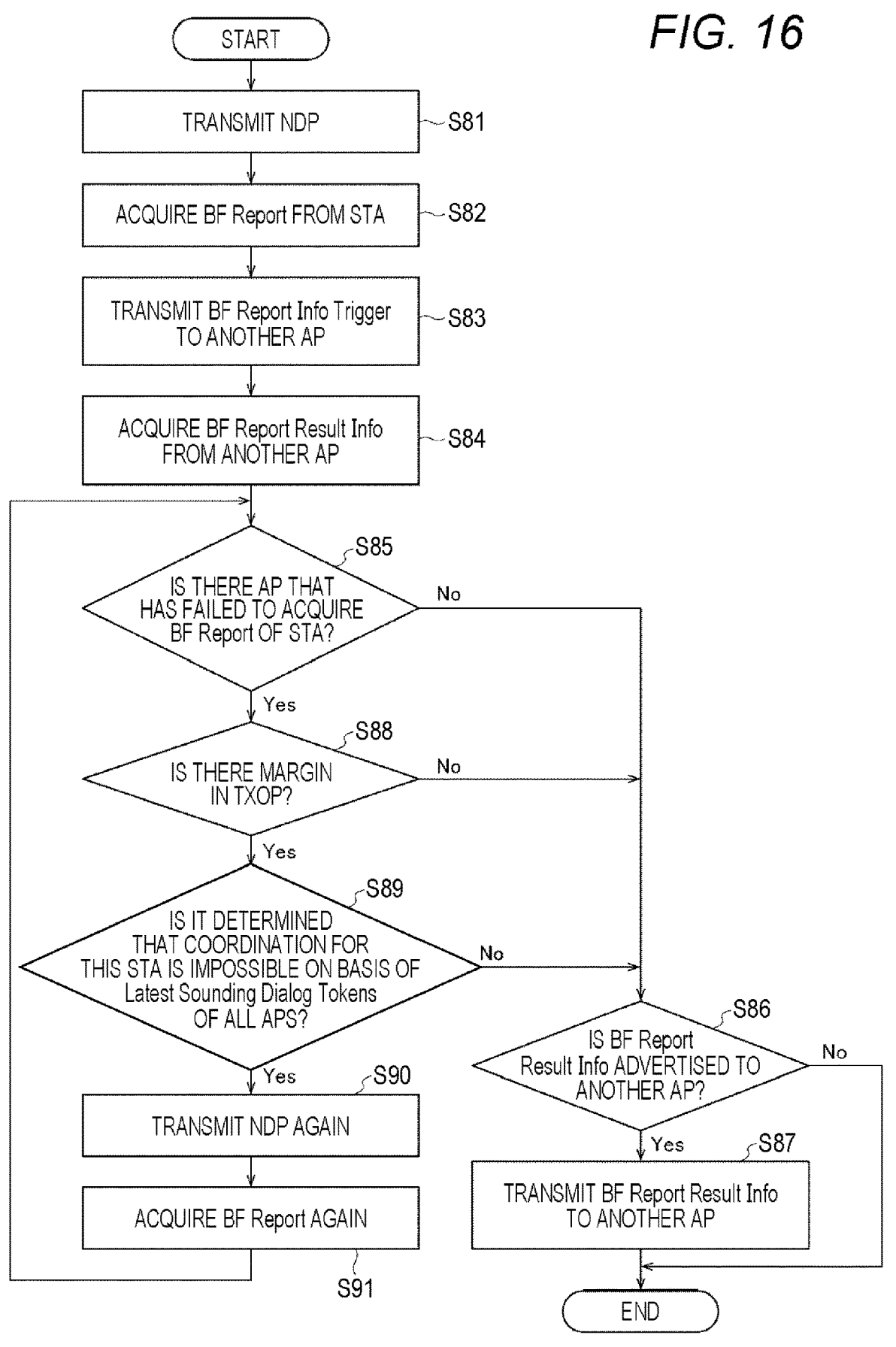

Step S89 in FIG. 16 of the processing executed by the master AP in the Sounding Phase in the second embodiment (S81 to S91 in FIG. 16) is different in processing details from step S39 in FIG. 9 of the processing executed by the master AP in the Sounding Phase in the first embodiment (S31 to S41 in FIG. 9).

That is, in step S89 in FIG. 16, the Sounding Dialog Token information is used in determining whether or not to re-execute the sounding processing. In the execution determination in step S89, for example, in a case where the following two conditions ((e), (f)) are satisfied (No in S89), the final result of the BF Report is advertised to another access point AP by means of the BF Report Result Info without re-execution of sounding (Yes in S86, S87), or the processing is simply terminated (No in S86).

(e) A difference between the Latest Sounding Dialog Token of a certain wireless terminal STA held by an access point AP that has failed to acquire the BF Report of the wireless terminal STA and the latest Sounding Dialog Token is greater than or equal to a threshold corresponding to the Absolute Sounding Dialog Token Difference Threshold.

(f) A difference between the Latest Sounding Dialog Token of a certain wireless terminal STA held by an access point AP that has failed to acquire the BF Report of the wireless terminal STA and the Latest Sounding Dialog Token of the wireless terminal STA held by another access point AP is greater than or equal to a threshold corresponding to the Relative Sounding Dialog Token Difference Threshold.

Furthermore, in a case where at least any one of the above-described two conditions ((e), (f)) is not satisfied (Yes in S89), the master AP retransmits the NDP or controls itself or another access point AP to acquire the BF Report again (S90, S91).

(S4: Coordinated Tx Phase)

The sequence of the Coordinated Tx Phase in the second embodiment is similar to the sequence of the Coordinated Tx Phase in the first embodiment (FIG. 10), so that the description thereof will be omitted.

FIG. 17 is a diagram illustrating a configuration example of the Coordination Request frame.

The Coordination Request frame in the second embodiment is different from the Coordination Request frame (FIG. 11) in the first embodiment in that the Latest Sounding Time Request Flag is replaced with Latest Sounding Dialog Token Request Flag.

That is, the Coordination Request frame includes, as Frame Body, Sharing AP Info and Candidate AP Info, and the Candidate AP Info includes a field of the Latest Sounding Dialog Token Request Flag together with the AP ID.

The AP ID includes identifier information of the coordination candidate AP. The Latest Sounding Dialog Token Request Flag includes flag information indicating whether or not to request the number information of sounding processing when the BF Report is last acquired from the wireless terminal STA. Note that in a case where the information has already been acquired from all the access points AP in the Sounding Phase (S3), the flag may be set to false.

Figure 18:
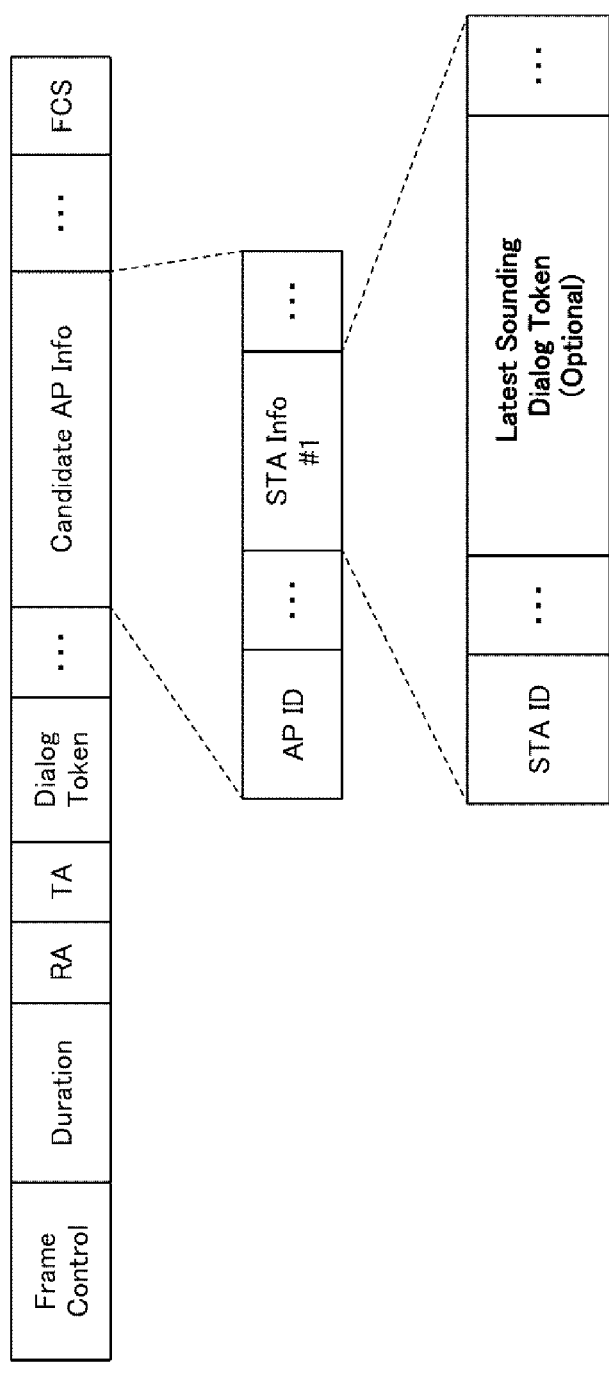
FIG. 18 is a diagram illustrating a configuration example of the Coordination Response frame.

FIG. 18 is a diagram illustrating a configuration example of the Coordination Response frame.

The Coordination Response frame in the second embodiment is different from the Coordination Response frame in the first embodiment (FIG. 12) in that the Latest Sounding Time is replaced with the Latest Sounding Dialog Token.

That is, the Coordination Response frame includes, as Frame Body, Candidate AP Info, and the Candidate AP Info includes a field of STA Info including the STA ID and the Latest Sounding Dialog Token together with the AP ID.

The AP ID includes identifier information of the coordination candidate AP. The STA ID includes identifier information of the wireless terminal STA to which transmission is intended. The Latest Sounding Dialog Token includes number information of sounding processing when the BF Report is last acquired from the wireless terminal STA. Note that the Latest Sounding Dialog Token is advertised only in a case where the Latest Sounding Dialog Token Request Flag in the Coordination Request frame is "true".

Next, a processing flow of the sharing AP in the Coordinated Tx Phase will be described with reference to a flowchart in FIG. 19.

Figure 19:
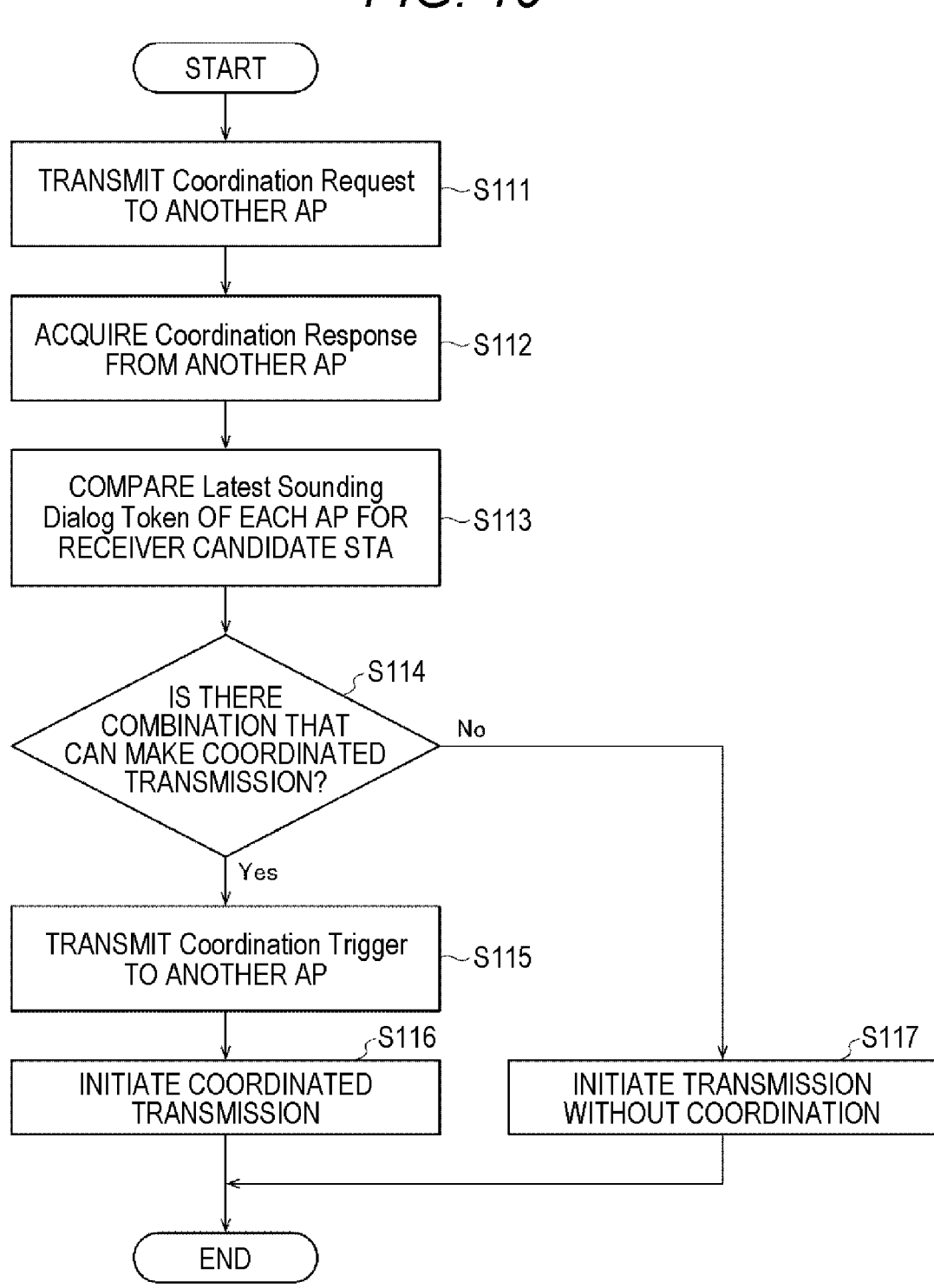
FIG. 19 is a flowchart illustrating a processing flow of the sharing AP in the Coordinated Tx Phase.

Steps S113 and S114 in FIG. 19 of the processing executed by the sharing AP in the Coordinated Tx Phase in the second embodiment (111 to S117 in FIG. 19) are different in processing details from steps S63 and S64 in FIG. 13 of the processing executed by the sharing AP in the Coordinated Tx Phase in the first embodiment (S61 to S67 in FIG. 13).

That is, in steps S113 and S114 in FIG. 19, the Sounding Dialog Token information is used in determining whether or not to execute coordinated transmission. As criteria for determining whether or not there is a combination that can execute coordinated transmission in step S114, for example, when the following two conditions ((g), (h)) are all satisfied in the sharing AP, any shared AP (any access point AP among access points AP that have returned the Coordination Response), and any one or more of the wireless terminals STA serving as receivers, it can be determined that there is a combination that can execute coordinated transmission.

(g) A difference between the Latest Sounding Dialog Token of a wireless terminal STA serving as a receiver and the latest Sounding Dialog Token in any access point AP is less than a threshold corresponding to the Absolute Sounding Dialog Token Difference Threshold.

(h) A difference between the Latest Sounding Dialog Tokens of the wireless terminal STA serving as a receiver held by the access points AP is less than a threshold corresponding to the Relative Sounding Dialog Token Difference Threshold.

As described above, in the second embodiment, the configuration and the processing for determining whether or not to re-execute sounding and determining whether or not to execute coordinated transmission on the basis of the Sounding Dialog Token have been described. In the communication device 10 that executes such processing as described above, the following processing is executed by at least one of the control unit 100 or the communication control unit 111.

That is, the communication device 10 (for example, the access point AP) exchanges a first information (for example, the Coordination Set frame) that is used when a plurality of communication devices (for example, a plurality of access points AP) executes coordinated transmission with a first another communication device (for example, another access point AP) by means of wireless communication, and performs control to share threshold information regarding the sounding time (for example, the Absolute Sounding Dialog Token Difference Threshold, the Relative Sounding Dialog Token Difference Threshold) with the first another communication device on the basis of the first information.

For example, whether or not to re-execute sounding or whether or not to execute coordinated transmission is determined on the basis of the threshold information. The threshold information includes processing information (for example, the Sounding Dialog Token) associated with the sounding processing.

With the configuration in the second embodiment employed, the determination as to whether or not to re-execute the Sounding Phase and the determination as to whether or not to execute coordinated transmission during data transmission are made on the basis of the Sounding Dialog Token, so that it is possible to improve the system throughput.

Note that the series of processing of the communication device 10 described above can be executed by hardware or software. In a case where the series of processing is executed by software, a program constituting the software is installed on the communication device 10.

Furthermore, the embodiments of the present technology are not limited to the above-described embodiments, and various modifications are possible without departing from the scope of the present technology. For example, each embodiment has been described above with reference to the sequence diagrams, the frame configuration diagrams, and the flowcharts, but these embodiments are not necessarily limited to the illustrated configurations, and may be selectively used according to a situation. Moreover, the effects described herein are merely examples and are not limited, and other effects may be provided.

Note that the present technology can have the following configurations.

(1)

A communication device including
a control unit configured to perform control
to exchange, with a first another communication device by means of wireless communication, first information that is used when a plurality of communication devices executes coordinated transmission
to share, with the first another communication device, threshold information regarding a sounding time on the basis of the first information.

(2)

The communication device according to the above (1), in which
the control unit determines whether or not to re-execute sounding or determines whether or not to execute coordinated transmission on the basis of the threshold information.

(3)

The communication device according to the above (2), in which
the threshold information includes at least one of an absolute value of the sounding time or a relative value of the sounding time.

(4)

The communication device according to the above (2), in which
the threshold information includes time information or processing information associated with sounding processing.

(5)

The communication device according to any one of the above (1) to (4), in which
the threshold information is set for each coordination scheme.

(6)

The communication device according to any one of the above (1) to (5), in which
the threshold information is set for each second another communication device serving as a data receiver.

(7)

The communication device according to any one of the above (1) to (6), in which
the threshold information is a fixed value set for each of the plurality of communication devices that operates in a coordinated manner or a variable value determined on the basis of a surrounding environment.

(8)

The communication device according to any one of the above (1) to (7), in which
the control unit determines whether or not to re-execute sounding in same processing on a second another communication device serving as a data receiver during sounding from which the control unit has failed to acquire second information, on the basis of sounding time information of the second another communication device and the threshold information for each of the plurality of communication devices that operates in a coordinated manner.

(9)

The communication device according to the above (8), in which
the control unit
collects third information including an acquisition status of the second information from the first another communication device and
determines whether or not to re-execute sounding in same processing on the basis of the third information.

(10)

The communication device according to the above (8) or (9), in which
the control unit
collects, from the first another communication device, third information including sounding time information when the second information is last acquired and
determines whether or not to re-execute sounding in same processing on the basis of the third information.

(11)

The communication device according to any one of the above (1) to (7), in which the control unit determines whether or not to execute coordinated transmission to a second another communication device serving as a data receiver during data transmission on the basis of sounding time information of the second another communication device and the threshold information for each of the plurality of communication devices that operates in a coordinated manner.

(12)

The communication device according to the above (11), in which the control unit determines a coordination scheme or the second another communication device on the basis of the sounding time information and the threshold information.

(13)

The communication device according to any one of the above (1) to (12), configured as an access point in a wireless LAN system, in which the first another communication device is another access point.

(14)

The communication device according to the above (6), (8), or (11), configured as an access point in a wireless LAN system, in which the first another communication device is another access point, and the second another communication device is a wireless terminal.

(15)

A communication method including causing a communication device to exchange, with a first another communication device by means of wireless communication, first information that is used when a plurality of communication devices executes coordinated transmission to share, with the first another communication device, threshold information regarding a sounding time on the basis of the first information.

REFERENCE SIGNS LIST

10 Communication device
100 Control unit
101 Wireless communication unit
102 Storage unit
103 WAN communication unit
111 Communication control unit
112 Communication storage unit
113 Data processing unit
114 Signal processing unit
115 Wireless interface unit
116 Amplification unit
117 Antenna

The invention claimed is:

1. A communication device, comprising
a control unit configured to:
control exchange of first information with a first communication device via wireless communication, wherein
the first information is associated with a first plurality of communication devices, and
the first plurality of communication devices executes coordinated transmission;

control a sharing process of threshold information, based on the first information, with the first communication device, wherein the threshold information is associated with a sounding process time; and
determine, based on the threshold information, one of re-execution of a sounding process or the execution of the coordinated transmission.

2. The communication device according to claim 1, wherein the threshold information includes at least one of an absolute value of the sounding process time or a relative value of the sounding process time.

3. The communication device according to claim 1, wherein the threshold information includes one of time information or processing information that is associated with the sounding process.

4. The communication device according to claim 1, wherein the threshold information is associated with each of a plurality of coordination schemes.

5. The communication device according to claim 1, wherein
the threshold information is associated with each of a second plurality of communication devices, and
each of the second plurality of communication devices corresponds to a data receiver.

6. The communication device according to claim 1, wherein
the control unit is further configured to determine, based on a surrounding environment, the threshold information for each of the first plurality of communication devices is one of a fixed value or a variable value, and
the first plurality of communication devices operates in a coordinated manner.

7. The communication device according to claim 1, wherein
the control unit is further configured to:
acquire second information; or
determine a failure of the acquisition of the second information; and
determine, at a time of the sounding process, the re-execution of the sounding process in a specific process on a second communication device, based on sounding time information,
the threshold information for each of the first plurality of communication devices, and
the determined failure of the acquisition of the second information,
the second communication device corresponds to a data receiver, and
each of the first plurality of communication devices operates in a coordinated manner.

8. The communication device according to claim 7, wherein the control unit is further configured to:
receive, from the first communication device, third information that includes an acquisition status of the second information, and
determine, based on the third information, the re-execution of the sounding process in the specific process.

9. The communication device according to claim 7, wherein the control unit is further configured to:
receive, from the first communication device, third information that includes the sounding time information at a time of the acquisition of the second information; and
determine, based on the third information, the re-execution of the sounding process in the specific process.

10. The communication device according to claim 1, wherein the control unit is further configured to determine an execution of coordinated transmission to a second communication device based on each of sounding time information and the threshold information for each of the first plurality of communication devices, the execution of the coordinated transmission is determined at a time of a data transmission, the second communication device corresponds to a data receiver, and each of the first plurality of communication devices operates in a coordinated manner.

11. The communication device according to claim 10, wherein the control unit is further configured to determine, based on each of the sounding time information and the threshold information, one of a coordination scheme or the second communication device.

12. The communication device according to claim 1, wherein the communication device is configured as a first access point in a wireless LAN system, and wherein the first communication device is a second access point.

13. The communication device according to claim 5, wherein the communication device is configured as a first access point in a wireless LAN system, the first communication device is a second access point, and a specific communication device of the second plurality of communication devices is a wireless terminal.

14. A communication method, comprising in a communication device;

controlling exchange of first information with a first communication device via wireless communication, wherein the first information is associated with a plurality of communication devices, and the plurality of communication devices executes coordinated transmission;

controlling a sharing process of threshold information, based on the first information, with the first communication device, wherein the threshold information is associated with a sounding process time; and determining, based on the threshold information, one of re-execution of a sounding process or the execution of the coordinated transmission.

\* \* \* \* \*